(12) United States Patent
Nabki et al.

(10) Patent No.: US 11,658,701 B2
(45) Date of Patent: *May 23, 2023

(54) SYSTEMS AND METHODS FOR ULTRA WIDEBAND IMPULSE RADIO TRANSCEIVERS

(71) Applicant: TRANSFERT PLUS SOCIETE EN COMMANDITE, Montreal (CA)

(72) Inventors: Frederic Nabki, Montreal (CA); Dominic Deslandes, Chambly (CA); Mohammad Taherzadeh-Sani, Montreal (CA); Michiel Soer, Montreal (CA)

(73) Assignee: Transfert Plus, Société En Commandite, Québec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,551

(22) Filed: Jun. 17, 2022

(65) Prior Publication Data
US 2022/0321165 A1    Oct. 6, 2022

Related U.S. Application Data

(63) Continuation of application No. 17/375,456, filed on Jul. 14, 2021, which is a continuation of application
(Continued)

(51) Int. Cl.
*H04K 1/02* (2006.01)
*H04B 1/717* (2011.01)
(Continued)

(52) U.S. Cl.
CPC .......... *H04B 1/717* (2013.01); *H04B 1/1615* (2013.01); *H04B 1/385* (2013.01); *H04B 1/7163* (2013.01);
(Continued)

(58) Field of Classification Search
CPC ...... H04B 1/717; H04B 1/1615; H04B 1/385; H04B 1/7163
(Continued)

(56) References Cited

U.S. PATENT DOCUMENTS 6,456,221 B2    9/2002  Low et al.
9,614,537 B1    4/2017  Nandwana et al.
(Continued)

*Primary Examiner* — Zewdu A Kassa
(74) *Attorney, Agent, or Firm* — Rosenberg, Klein & Lee

(57) ABSTRACT

Ultra-Wideband (UWB) technology exploits modulated coded impulses over a wide frequency spectrum with very low power over a short distance for digital data transmission. Today's leading edge modulated sinusoidal wave wireless communication standards and systems achieve power efficiencies of 50 nJ/bit employing narrowband signaling schemes and traditional RF transceiver architectures. However, such designs severely limit the achievable energy efficiency, especially at lower data rates such as below 1 Mbps. Further, it is important that peak power consumption is supportable by common battery or energy harvesting technologies and long term power consumption neither leads to limited battery lifetimes or an inability for alternate energy sources to sustain them. Accordingly, it would be beneficial for next generation applications to exploit inventive transceiver structures and communication schemes in order to achieve the sub nJ per bit energy efficiencies required by next generation applications.

8 Claims, 18 Drawing Sheets

Related U.S. Application Data

No. 16/261,797, filed on Jan. 30, 2019, now Pat. No. 11,201,638, which is a continuation of application No. 15/578,478, filed as application No. PCT/CA2016/000161 on May 31, 2016, now Pat. No. 10,608,699.

(60) Provisional application No. 62/169,066, filed on Jun. 1, 2015.

(51) Int. Cl.
    *H04L 7/00* (2006.01)
    *H04B 1/16* (2006.01)
    *H04B 1/3827* (2015.01)
    *H04L 25/49* (2006.01)
    *H04L 27/22* (2006.01)
    *H04L 1/00* (2006.01)
    *H04L 27/26* (2006.01)
    *H04L 5/00* (2006.01)
    *H04B 1/7163* (2011.01)
    *H04L 25/00* (2006.01)
    *H04B 1/7183* (2011.01)
    *H04L 7/033* (2006.01)
    *H04L 25/03* (2006.01)

(52) U.S. Cl.
    CPC .......... *H04B 1/7183* (2013.01); *H04L 1/0057* (2013.01); *H04L 5/0044* (2013.01); *H04L 7/00* (2013.01); *H04L 7/0091* (2013.01); *H04L 7/033* (2013.01); *H04L 25/00* (2013.01); *H04L 25/03834* (2013.01); *H04L 25/4902* (2013.01); *H04L 27/22* (2013.01); *H04L 27/2647* (2013.01)

(58) Field of Classification Search
    USPC ................................ 375/297, 295, 316, 219
    See application file for complete search history.

(56) References Cited

U.S. PATENT DOCUMENTS

| | | |
|---|---|---|
| 2002/0051482 A1 | 5/2002 | Lomp |
| 2002/0064245 A1 | 5/2002 | McCorkie |
| 2003/0032422 A1 | 2/2003 | Wynbeek |
| 2003/0108133 A1 | 6/2003 | Richards |
| 2003/0161382 A1 | 8/2003 | Hershey et al. |
| 2004/0002346 A1 | 1/2004 | Santhoff |
| 2005/0041746 A1 | 2/2005 | Rosen et al. |
| 2005/0058114 A1* | 3/2005 | Santhoff ............ H04B 1/71632 370/343 |
| 2005/0110687 A1 | 5/2005 | Starkie et al. |
| 2006/0165155 A1 | 7/2006 | Liu et al. |
| 2007/0260236 A1 | 11/2007 | Han et al. |
| 2007/0266395 A1 | 11/2007 | Lee et al. |
| 2008/0315928 A1 | 12/2008 | Waheed et al. |
| 2008/0315959 A1 | 12/2008 | Zhuang et al. |
| 2009/0041156 A1 | 2/2009 | Lakkis et al. |
| 2010/0062705 A1 | 3/2010 | Rajkotia et al. |
| 2010/0062726 A1 | 3/2010 | Zheng et al. |
| 2010/0091688 A1 | 4/2010 | Staszewski et al. |
| 2010/0113105 A1 | 5/2010 | Xu et al. |
| 2013/0051449 A1 | 2/2013 | Georgi |
| 2013/0279429 A1* | 10/2013 | Magne .................. H04H 20/72 370/329 |
| 2014/0170997 A1 | 6/2014 | Hung et al. |
| 2014/0219384 A1 | 8/2014 | Hori |
| 2016/0099765 A1 | 4/2016 | Hosokawa |

\* cited by examiner

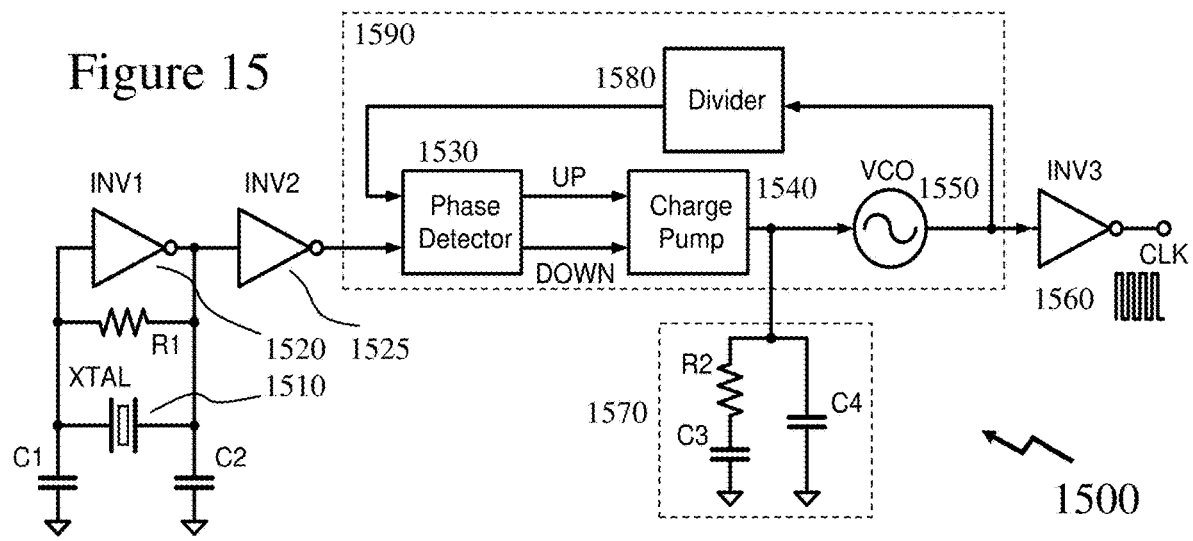
Figure 15
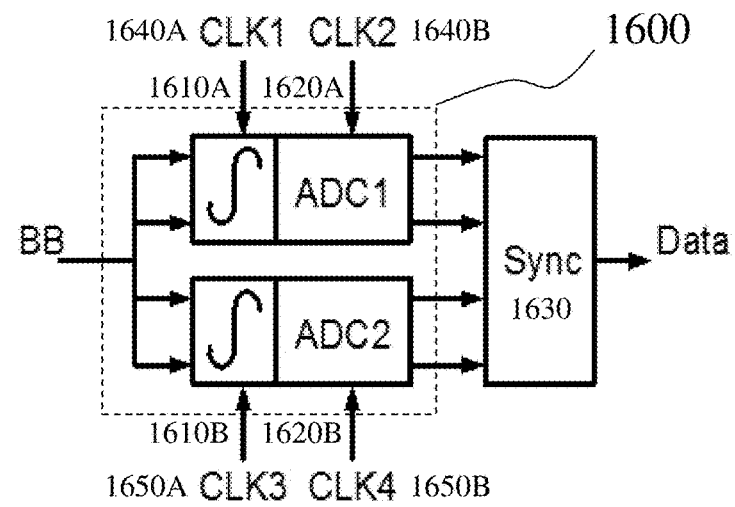
Figure 16A
Figure 16B
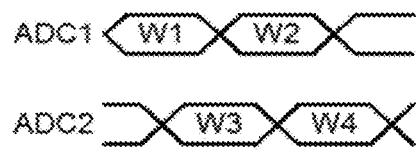

Repeat this sequence until there is no more data left
User continuously reads data at 10Mbps

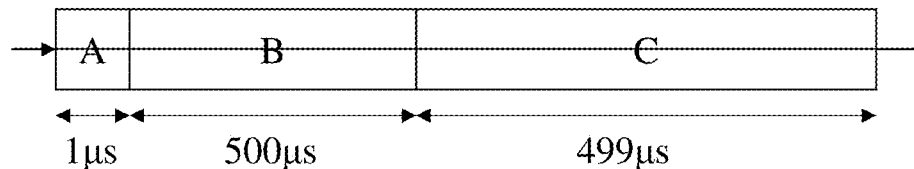

1μs   500μs   499μs

A: Preamble
Duration: 1μs
Consists of 20 bits
Transmitter Pulsing
Energy: 0.5nJ / symbol

B: Payload
Duration: 500μs
Consists of 10000 bits
Transmitter Pulsing
Energy: 0.5nJ / symbol

C: Idle Mode
Duration: 499μs
20MHz clock still active
Current: 10μA

Figure 20A

Repeat this sequence until there is no more data left
User continuously reads data at 10Mbps

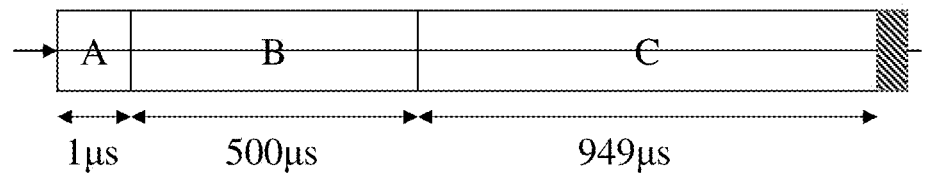

1μs   500μs   949μs

A: Preamble
Duration: 1μs
Consists of 20 bits
Receiver is fully on
Current: 12mA

B: Payload
Duration: 500μs
Consists of 10000 bits
Receiver is fully on
Current: 12mA

C: Idle Mode
Duration: 949μs
20MHz clock still active
Receiver front-end is
off for 498.9μs
Current: 10μA

Figure 20B

Repeat this sequence until there is no more data left
User continuously reads data at 1Mbps

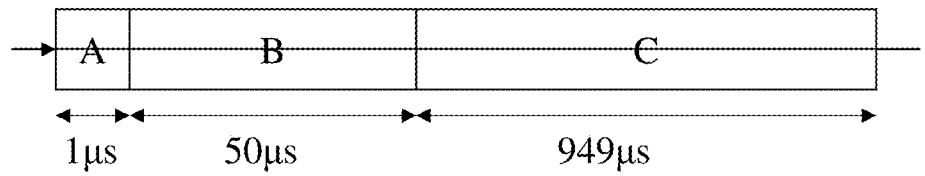

| A: Preamble | B: Payload | C: Idle Mode |
|---|---|---|
| Duration: 1μs | Duration: 50μs | Duration: 949μs |
| Consists of 20 bits | Consists of 1000 bits | 20MHz clock still active |
| Transmitter Pulsing | Transmitter Pulsing | Current: 10μA |
| Energy: 0.5nJ / symbol | Energy: 0.5nJ / symbol | |

Figure 21A

Repeat this sequence until there is no more data left
User continuously reads data at 1Mbps

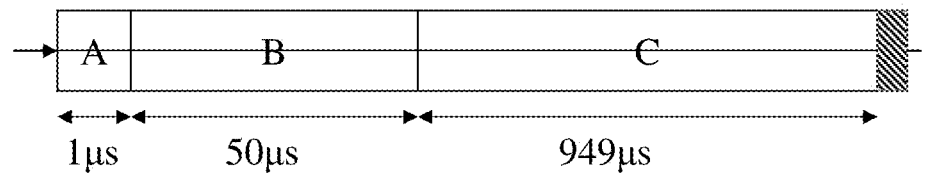

A: Preamble
Duration: 1μs
Consists of 20 bits
Receiver is fully on
Current: 12mA

B: Payload
Duration: 50μs
Consists of 1000 bits
Receiver is fully on
Current: 12mA

C: Idle Mode
Duration: 949μs
20MHz clock still active
Receiver front-end is
off for 948.9μs
Current: 10μA

Figure 21B

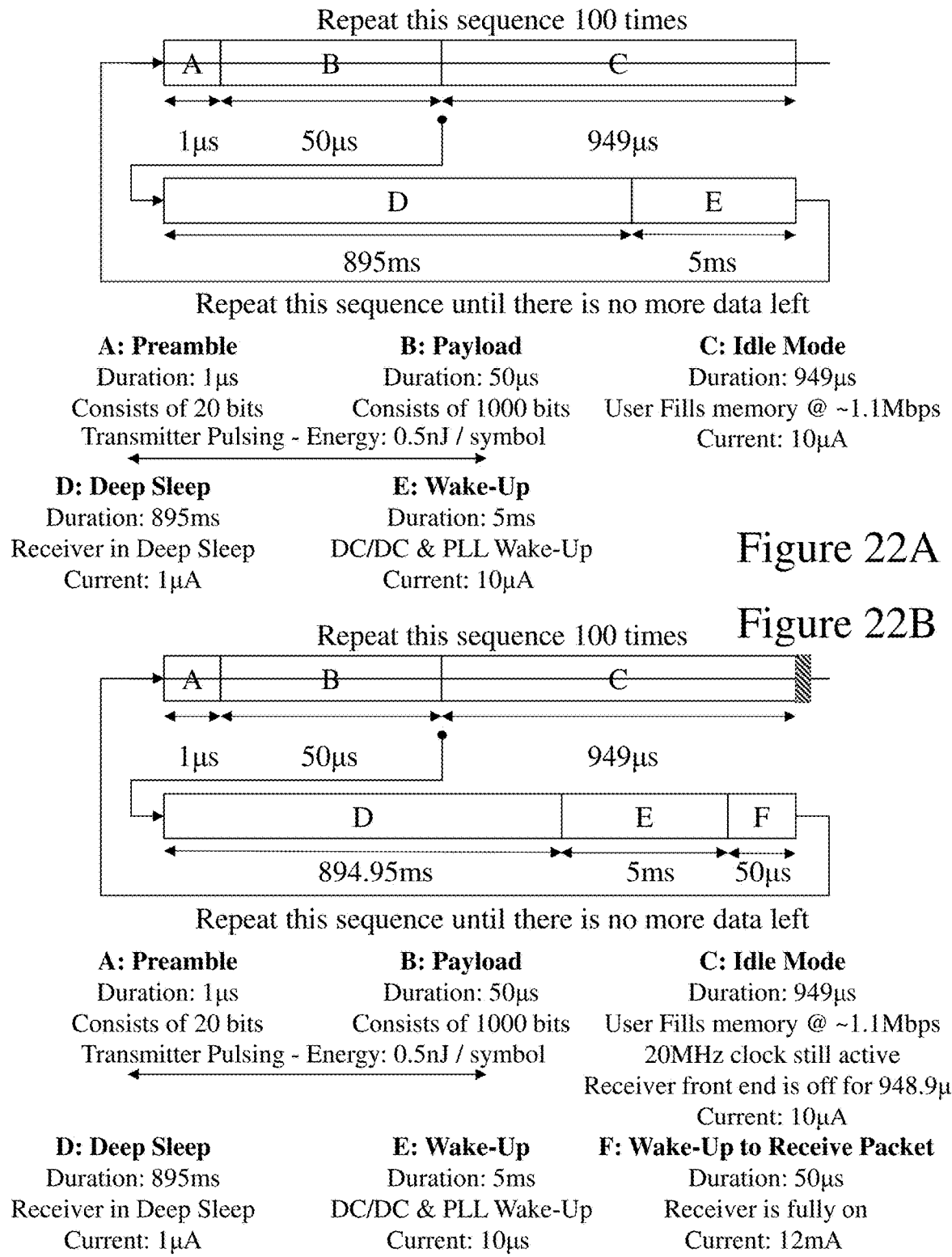

Repeat this sequence until there is no more data left
User continuously reads data at 100kbps

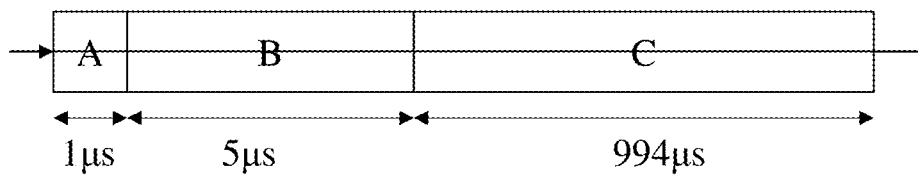

A: Preamble
Duration: 1μs
Consists of 20 bits
Transmitter Pulsing
Energy: 0.5nJ / symbol

B: Payload
Duration: 5μs
Consists of 100 bits
Transmitter Pulsing
Energy: 0.5nJ / symbol

C: Idle Mode
Duration: 994μs
20MHz clock still active
Current: 10μA

Figure 22C

Repeat this sequence until there is no more data left
User continuously reads data at 10Mbps

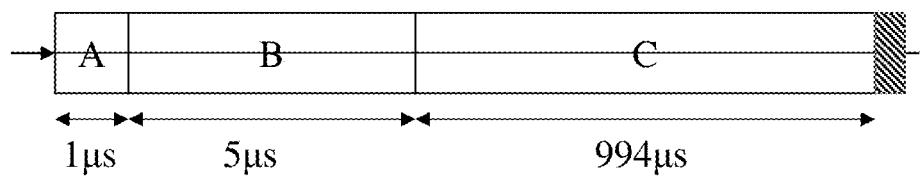

A: Preamble
Duration: 1μs
Consists of 20 bits
Receiver is fully on
Current: 12mA

B: Payload
Duration: 5μs
Consists of 100 bits
Receiver is fully on
Current: 12mA

C: Idle Mode
Duration: 994μs
20MHz clock still active
Receiver front-end is
off for 993.9μs
Current: 10μA

Figure 22D

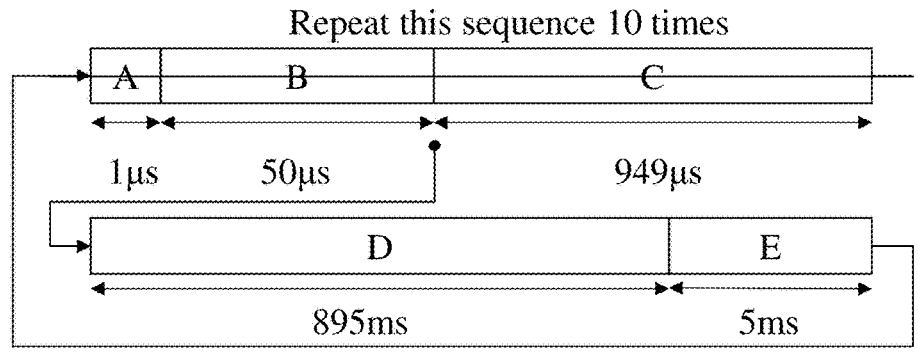

Repeat this sequence until there is no more data left

A: Preamble
Duration: 1μs
Consists of 20 bits
Transmitter Pulsing - Energy: 0.5nJ / symbol

B: Payload
Duration: 50μs
Consists of 1000 bits

C: Idle Mode
Duration: 949μs
User Fills memory @ ~1.1Mbps
Current: 10μA

D: Deep Sleep
Duration: 895ms
Receiver in Deep Sleep
Current: 1μA

E: Wake-Up
Duration: 5ms
DC/DC & PLL Wake-Up
Current: 10μA

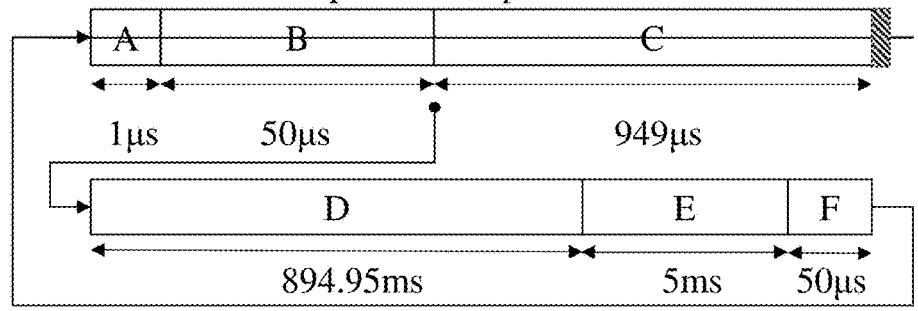

Repeat this sequence until there is no more data left

A: Preamble
Duration: 1μs
Consists of 20 bits
Transmitter Pulsing - Energy: 0.5nJ / symbol

B: Payload
Duration: 50μs
Consists of 1000 bits

C: Idle Mode
Duration: 949μs
User Fills memory @ ~1.1Mbps
20MHz clock still active
Receiver front end is off for 948.9μs
Current: 10μA

D: Deep Sleep
Duration: 895ms
Receiver in Deep Sleep
Current: 1μA

E: Wake-Up
Duration: 5ms
DC/DC & PLL Wake-Up
Current: 10μs

F: Wake-Up to Receive Packet
Duration: 50μs
Receiver is fully on
Current: 12mA Repeat this sequence until there is no more data left
User continuously reads data at 10kbps

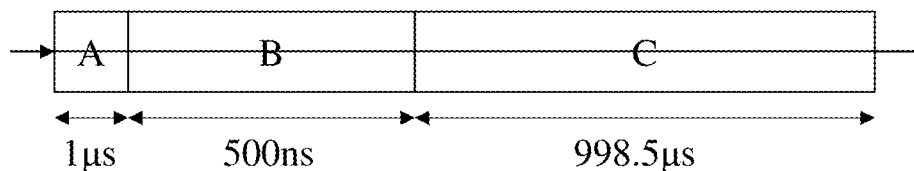

A: Preamble
Duration: 1μs
Consists of 20 bits
Transmitter Pulsing
Energy: 0.5nJ / symbol

B: Payload
Duration: 500ns
Consists of 10 bits
Transmitter Pulsing
Energy: 0.5nJ / symbol

C: Idle Mode
Duration: 998.5μs
20MHz clock still active
Current: 10μA

Figure 23C

Repeat this sequence until there is no more data left
User continuously reads data at 10kbps

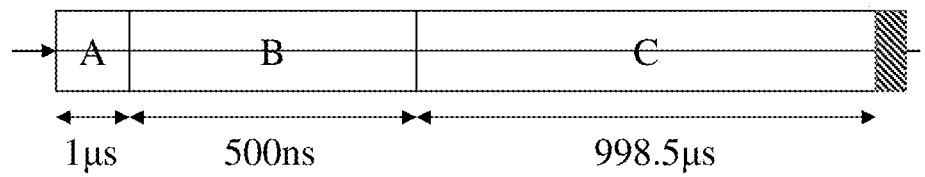

A: Preamble
Duration: 1μs
Consists of 20 bits
Receiver is fully on
Current: 12mA

B: Payload
Duration: 500ns
Consists of 10 bits
Receiver is fully on
Current: 12mA

C: Idle Mode
Duration: 998.5μs
20MHz clock still active
Receiver front-end is
off for 998.4μs
Current: 10μA

Figure 23D

SYSTEMS AND METHODS FOR ULTRA WIDEBAND IMPULSE RADIO TRANSCEIVERS

CROSS-REFERENCE TO RELATED APPLICATIONS

This patent application claims the benefit of priority as a continuation of U.S. patent Ser. No. 17/375,456 filed Jul. 14, 2021; which itself claims the benefit of priority as a continuation from U.S. patent application Ser. No. 16/261,797 filed Jan. 30, 2019 which has issued as U.S. Pat. No. 11,201,638; which itself claims the benefit of priority as a continuation of U.S. patent application Ser. No. 15/578,478 filed Nov. 30, 2017 which has issued as U.S. Pat. No. 10,608,699; which itself claims priority as a 371 National Phase entry of PCT/CA2016/000,161 filed May 31, 2016; which itself claims the benefit of priority from U.S. Provisional Patent Application 62/169,066 filed Jun. 1, 2015; the entire contents of each being incorporated herein by reference.

FIELD OF THE INVENTION

This invention relates to ultra-wideband wireless communications and more particularly to transmitters, receivers, and transceivers with very low power consumption in links with infrequent data transmission.

BACKGROUND OF THE INVENTION

Ultra-Wideband (UWB) technology is a wireless technology for the transmission of digital data as modulated coded impulses over a very wide frequency spectrum with very low power over a short distance. Such pulse based transmissions are an alternative to transmitting information using a modulated sinusoidal wave, which is the technique currently employed within today's wireless communication standards and systems such as IEEE 802.11 (Wi-Fi), IEEE 802.15 wireless personal area networks (PANs), IEEE 802.16 (WiMAX), Universal Mobile Telecommunications System (UMTS), Global System for Mobile Communications (GSM), General Packet Radio Service (GPRS), and those accessing the Industrial, Scientific and Medical (ISM) bands, and International Mobile Telecommunications-2000 (IMT-2000).

UWB was formerly known as "pulse radio", but the Federal Communications Commission (FCC) and the International Telecommunication Union Radiocommunication Sector (ITU-R) currently define UWB in terms of a transmission from an antenna for which the emitted signal bandwidth exceeds the lesser of 500 MHz or 20% of the center frequency. Thus, pulse-based systems where each transmitted pulse occupies the full UWB bandwidth or an aggregate of at least 500 MHz of narrow-band carriers; for example, orthogonal frequency-division multiplexing (OFDM) can gain access to the UWB spectrum under the rules. Pulse repetition rates may be either low or very high. Pulse-based UWB radars and imaging systems tend to use low to moderate repetition rates (typically in the range of 1 to 100 megapulses per second). On the other hand, communications systems favor high repetition rates (typically in the range of one to two gigapulses per second), thus enabling short-range gigabit-per-second communications systems. As each pulse in a pulse-based UWB system occupies a large bandwidth, possibly even the entire UWB bandwidth, such systems are relatively immune to multipath fading but not intersymbol interference, unlike carrier modulation based systems which are subject to both deep fading and intersymbol interference (ISI).

Pulse based wireless communication has come a long way since being first allowed by the Federal Communication Commission (FCC). Able to offer both high data rates and very energy efficient transmissions over short ranges, multiple techniques have been developed for ultra-wideband (UWB) communication including multi-band orthogonal frequency division multiplexing (MB-OFDM), impulse radio (IR-UWB) and frequency modulation (FM-UWB) each with its specific strengths. The potential for very low power communications and precise ranging has seen the inclusion of UWB radios in multiple standards aimed for different applications such as low-rate wireless personal area networks (WPAN) with IEEE 802.15.4a and more recently wireless body area networks (WBAN) with IEEE 802.15.6.

When considering many applications, such as wireless sensor networks and portable electronics, UWB transceivers should ideally be functionally highly integrated for small footprint, support low cost and high volume manufacturing, and be energy efficient in order to run on a limited power source, e.g. a battery, indoor solar cell, small outdoor solar cell, or those developed upon evolving technologies such as thermal gradients, fluid flow, small fuel cells, piezoelectric energy harvesters, micro-machined batteries, and power over optical fiber. UWB has been considered for a long time a promising technology for these applications. By using discrete pulses as modulation, it is possible to implement efficient duty cycling schemes while the transmitter is not active, which can be further improved by using an On-Off Shift Keying (OOK) modulation. Further, some UWB operation frequencies, between 3.1 GHz and 10.6 GHz for example as approved by FCC for indoor UWB communication systems, see for example "First Report and Order in the Matter of Revision of Part 15 of the Commission's Rules Regarding Ultra-Wideband Transmission Systems" (FCC, ET-Docket 98-153, FCC 02-48), allow for small antennas which can easily be integrated into overall reduced footprint solutions such as sensors, mobile devices or portable electronics etc.

To date the primary applications for UWB networks have been high data rate personal area and local area networks (PANs/LANs) to exploit the increased data rates achievable over distances on the order of 50 meters. As such UWB (IEEE 802.15.3) sits within a set of wireless protocols including IEEE 802.15.1 (Bluetooth), IEEE 802.15.4 (ZigBee) and IEEE 802.11a/b/g (Wi-Fi) defining physical (PHY) and media access control (MAC) layers of wireless communications over ranges around 10-100 meters. In contrast to the other wireless protocols UWB offers lower complexity and cost, resistance to severe multipath interference and jamming (which is of particular benefit within indoor environments), a noise-like signal spectrum, and good time domain resolution for location and tracking applications.

Within the prior art the primary focus of the majority of wireless communications research has been concerned with maximizing utilization of narrow frequency spectrum, e.g. cellular wireless through GSM, EDGE, LTE, 4G etc., or maximizing link speeds, e.g. WiMAX (IEEE 802.16), Wi-Fi (IEEE 802.11n) etc. However, in a wide range of applications such as wearable devices, wireless location services, wireless sensor networks, etc. conventional wireless protocols as well as PAN/LAN protocols such as IEEE 802.15.1 (Bluetooth), IEEE 802.15.4 (Zigbee), and IEEE 802.11a/b/g (Wi-Fi) cannot meet the evolving requirements for ultra-efficient wireless communications and ultra-low power consumption particularly at the lower data rates many of these applications operate at due to their inherent architecture, communication layer or limited duty cycling ability.

Whilst efficiencies with IEEE 802.15.1 (Bluetooth) and IEEE 802.15.4 (Zigbee) on the order of approximately 50 nJ per bit are possible and innovative designs are attempting to further lower this figure, the narrowband signaling scheme used for communications in these systems and their reliance on traditional RF transceiver architectures severely limits the achievable energy efficiency, especially at lower data rates such as below 1 Mbps. Further, it is important that the peak power consumption not exceed that supportable by common battery technologies or energy harvesting technologies nor long term power consumption be too high such that battery lifetimes are very limited or alternate energy sources such as solar cells cannot sustain them.

Accordingly, it would be beneficial to rethink the entire transceiver structure and the communication scheme employed in order to achieve the sub nJ per bit energy efficiencies required by next generation applications.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to ultra-wideband wireless communications and more particularly to transmitters, receivers, and transceivers with very low power consumption in links with infrequent data transmission.

In accordance with an embodiment of the invention there is provided a method comprising:
establishing synchronization of at least one of a transmitter and a receiver forming part of an electronic device via dedicated synchronization hardware within the electronic device which includes a dual clock timer system, wherein the dual clock time system provides ultra-low power consumption during a sleep mode of the at least one of the transmitter and the receiver.

In accordance with an embodiment of the invention there is provided a transceiver comprising:
an integrated DC/DC converter; and
a duty cycled transceiver circuit, wherein
the transceiver supports at least one of fast circuit start-up and fast circuit shut-down to achieve low power consumption for data rate variations of at least one of 2 orders of magnitude, 3 orders of magnitude, 4 orders of magnitude and greater than 4 orders of magnitude.

In accordance with an embodiment of the invention there is provided a method comprising: employing an impulse radio for at least one of transmitting and receiving data over a wireless link;
wherein
each bit of data is encoded as a pulse bundle comprising multiple pulses per bundle that have real-time configurable parameters of at least one of phase, frequency, amplitude and bandwidth.

In accordance with an embodiment of the invention there is provided a wireless receiver comprising:
an intermediate frequency (IF) chain that utilizes an instantaneous bandwidth that is on the order of an individual pulse bandwidth whilst the total spectrum covers a much wider bandwidth by exploiting a pulse bundle per bit; wherein a pulse bundle comprises multiple pulses per bundle that have real-time configurable parameters of at least one of phase, frequency, and bandwidth.

In accordance with an embodiment of the invention there is provided a receiver comprising:
an intermedia frequency (IF) receiver stage comprising at least two stages of down-conversion; and
at least one of a high pass and a band-pass filter disposed between each pair of stages of the at least two stages of down-conversion,
wherein the first stage of each pair of stages of the at least two stages of down-conversion is a squaring stage that translates that an input RF signal spectrum at its input to an output RF signal spectrum that extends down to DC.

In accordance with an embodiment of the invention there is provided a method comprising shaping Gaussian RF pulses by applying pulses to a power amplifier and dynamically adjusting the ground connection of the power amplifier during each pulse according to a predetermined temporal characteristic.

In accordance with an embodiment of the invention there is provided an ultra-wide band transmitter supporting aggressive power cycling (pulse-level cycling).

In accordance with an embodiment of the invention there is provided an ultra-wide band transmitter comprising a voltage controlled oscillator employing pre-charging of nodes to at least one of enforce its start-up phase and to control the polarity of the pulses from the voltage controlled oscillator.

In accordance with an embodiment of the invention there is provided a synchronization circuit comprising a pair of parallel analog-to-digital convert/integrator structures, wherein the synchronization circuit achieves at least one of faster synchronization and enhanced interference detection.

In accordance with an embodiment of the invention there is provided a baseband transceiver employing a multiphase clock.

In accordance with an embodiment of the invention there is provided a receiver circuit comprising a double squaring method for enhancing at least one of the energy detection sensitivity and the noise rejection performance of a receiver comprising the receiver circuit and generating a rectified output signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 15 depicts a clock generator circuit schematic for a UWB transmitter/receiver/transceiver according to an embodiment of the invention;

FIGS. 16A and 16B depict an integrator/analog-to-digital synchronization circuit schematic for a UWB receiver/transceiver according to an embodiment of the invention;

FIGS. 20A and 20B depict a communications scheme, timing, and current consumption for UWB transmitter and receiver according to an embodiment of the invention operating at 10 Mbps;

FIGS. 21A and 21B depict a communications scheme, timing, and current consumption for UWB transmitter and receiver according to an embodiment of the invention operating at 1 Mbps;

FIGS. 22A and 22B depict a first communications scheme, timing, and current consumption for UWB transmitter and receiver according to an embodiment of the invention operating at 100 kbps;

FIGS. 22C and 22D depict a second communications scheme, timing, and current consumption for UWB transmitter and receiver according to an embodiment of the invention operating at 100 kbps;

FIGS. 23A and 23B depict a first communications scheme, timing, and current consumption for UWB transmitter and receiver according to an embodiment of the invention operating at 10 kbps; and FIGS. 23C and 23D depict a second communications scheme, timing, and current consumption for UWB transmitter and receiver according to an embodiment of the invention operating at 10 kbps.

DETAILED DESCRIPTION

Figure 1A:
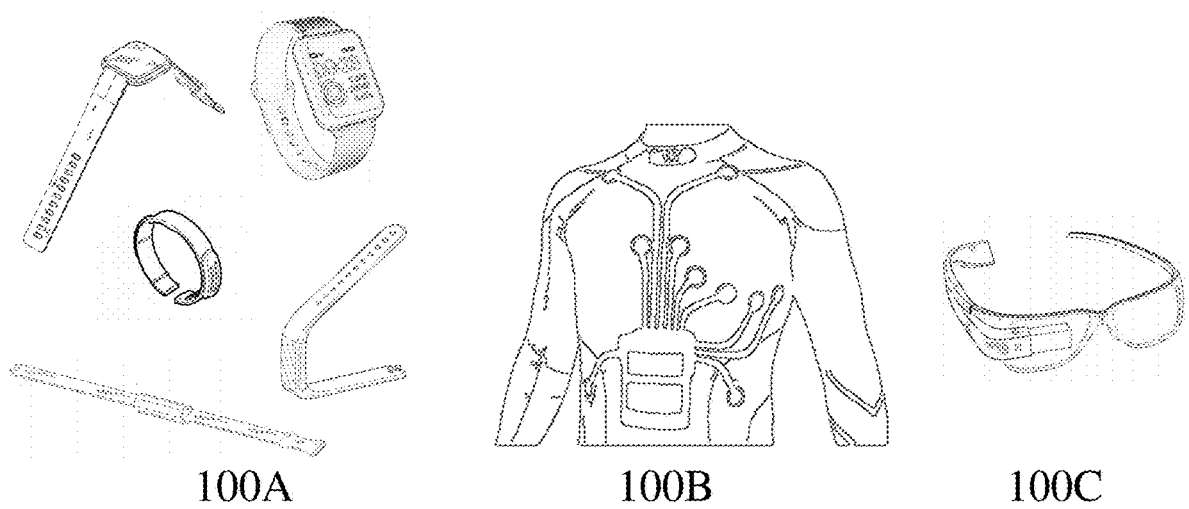
FIG. 1A depicts wearable technology supporting biometric data acquisition and/or presentation exploiting wireless communications according to embodiments of the invention.

The present invention is directed to ultra-wideband wireless communications and more particularly to transmitters, receivers, and transceivers with very low power consumption in links with infrequent data transmission.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

"Ultra-wideband" (UWB) as used herein and throughout this disclosure, refers to a radio communication system transmitting from an antenna for which the emitted signal bandwidth exceeds the lesser of 500 MHz or 20% of the center frequency.

A "radio" as used herein and throughout this disclosure, refers to a physical implementation of a system that can transmit and receive data wirelessly. This includes, but is not limited to, radio frequency integrated circuits, printed circuit board wireless modules.

An "impulse radio" as used herein and throughout this disclosure, refers to a radio system utilizing impulse-like signals for its transmission.

"Quasi low-IF" as used herein and through this disclosure, refers to an Intermediate Frequency (IF) generated within a RF signal processor circuit, such as a receiver for example, wherein signals within a first frequency range are converted to signals within a second frequency range and is used by the inventors to differentiate their inventive approach over the prior art wherein such conversions with different systems and methods are referred to as either "zero-IF", wherein they employ a subsequent high pass filter to remove a block of frequencies including DC from the second frequency range, or "low-IF", wherein the converted second frequency range includes DC but a subsequent RF circuit or RF element is AC coupled thereby removing a block of frequencies including.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a sensor node, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "user" as used herein may refer to, but is not limited to, an individual or group of individuals whose biometric data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, graphical user interface acquires, for example, electronic content. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

A: Problem with Ultra-Wideband Impulse Radio

As noted supra a number of applications including wearable devices, wireless location services, wireless sensor networks, etc. require ultra-efficient wireless communications that are not possible to obtain with conventional wireless radios exploiting conventional homodyne/heterodyne carrier-based radios as a result of insufficient duty cycling capability and complex hardware. As such these wireless radios cannot achieve the sub-nanojoule per bit (nJ/bit) energy efficiencies these applications seek or demand.

The inventors build upon their previous concepts established within World Intellectual Property Organization application PCT/CA2015/000,007 entitled "Methods and Systems Relating to Ultra-Wideband Broadcasting" filed Jan. 7, 2015 in order to allow for such ultra-efficient radios that leverage pulsed operation and signaling to generate a spectrum with a uniform and dense energy distribution. Accordingly, the inventors establish a novel circuit/system architecture, a novel pulse bundle communication structure, a novel fast and energy efficient synchronization scheme, and novel approach to inherent rejection of interference from existing services that allows for a spectrally and energy efficient, robust, and multi data rate (i.e., versatile) radio.

Such novel radios are not only suitable for the ultra-stringent energy requirement of the evolving digital environment of wearable devices, ubiquitous computing, biometrics, wireless sensor networks, structural health monitoring, location services, object tracking etc. but are also beneficially robust and agile in terms of operating spectrum, range and data rate. As such novel radios according to embodiments of the invention may be operated in a license-free portion of the radio spectrum, allowing for easy adoption of the technology for the aforementioned applications and thus forgoes the need for users to license spectrum to support services.

A1: Impulse Radio Limitations and Novel Mitigation Solutions

The inventors have identified multiple problems with impulse radio implementations on both the transmitter and receiver sides of the wireless link. On the transmitter side, an issue is that the emitted signal spectrum often contains spectral peaks that reduce the efficiency of the transmission. Additionally, a single pulse cannot effectively and efficiently cover a wide UWB spectrum due to the power required to create a single pulse which has both an optimized spectrum and a bandwidth in the GHz range. Accordingly, prior art impulse radios use static pulse patterns which can limit the robustness, efficiency and versatility of the radio with respect to spectrum shaping, enhanced detection, and multiple data rate operation. Furthermore, the spectral mask linked to UWB communications is very limiting with respect to the spectrum that can be transmitted, thereby further limiting the data rate or communications distance possible with prior art impulse radios.

On the receiver side, synchronizing the impulse radio receiver to the transmitter is difficult because of the inherent low duty cycle of the pulses, especially if the power efficiency promises of the technology are to be maintained. Additionally, impulse radios operate in a region of RF spectrum that is already occupied by multiple existing narrowband services, so the receiver must be able to tolerate the interference created by these pre-existing systems. Importantly, in full system implementations, slow wakeup/sleep times prevent achieving peak energy efficiency at lower data rates. As such, these limitations of prior art impulse radios reduce their efficiency and limit their versatility not only against the potential of UWB impulse radio, but what is made possible by the embodiments of the invention described and discussed within this specification.

Many innovative circuit/system architectures and methods related to the integrated circuit implemented as a prototype of the impulse radio UWB transceiver by the inventors mitigate the limitations of traditional radios or other impulse radios. These novel enhancements according to embodiments of the invention are listed below and provide for a robust real-time spectrally reconfigurable, spectrally and energy efficient and multi data rate capable impulse radio that fully harnesses the inherent benefits of impulse signaling. The various elements and implementations with respect of embodiments of the invention and the prototype UWB transceiver according to an embodiment of the invention are described below with respect to the specification alone and in combination with the Figures.

The inventors therefore have established the following novel aspects of wireless UWB transmitters/receivers/transceivers:

A1: Low Latency Transmitter/Receiver Synchronization Method/Algorithm using dedicated synchronization hardware, including a dual clock timer system for ultra-low sleep mode power consumption. This allows for efficient synchronization between transmitter (Tx) and receiver (Rx) in order to maintain the extremely aggressive duty cycling of the radios according to embodiments of the invention, thereby maintaining the energy efficiency inherent to impulse radio communications.

A2: Millisecond-Range Start-Up and Microsecond-Range Idle Recovery wherein exploitation of a custom integrated DC/DC converter and duty cycled transceiver circuitry that enables fast (millisecond) circuit start-up from sleep mode for optimal power consumption under low and high data rates (e.g. 1 kbps up to 10 Mbps) as well as microsecond recovery from an idle mode.

A3: Dynamic Pulse Bundle Spectrum Shaping wherein the impulse radio exploits pulse bundles comprising multiple pulses per bundle with real-time configurable parameters, e.g. phase, frequency, and bandwidth, allowing dynamic UWB spectrum filling in order to:
- achieve robust communications in the presence of channel and multipath fading;
- allow for optimal spectrum shaping and whitening to dynamically meet indoor and outdoor UWB standard requirements;
- allow the radio to conform to the different radiated power emission masks imposed by region/country specific regulatory bodies;
- allow for different pulse bundle schemes to cover multiple data rates and range requirements;
- allow for a very wide bandwidth without resorting to ultra-narrow pulses that have very wide bandwidths, i.e. multi-GHz bandwidth spanning, thereby simplifying the radio circuitry both in the transmitter and receiver and increasing the radio's energy efficiency;
- spread pulse energy over a practical time scale, e.g. 10 s of nanoseconds, for receiver duty cycling and synchronization while simultaneously occupying a wide spectral bandwidth; and
- reduce spectral sidelobes for easier compliance with emission spectral masks.

A4: Receiver IF Chain Instantaneous and Pulse Bandwidth Equalization wherein an instantaneous bandwidth which is on the order of an individual pulse bandwidth, e.g. 500 MHz, is utilized whilst the total spectrum covers a much wider bandwidth (BW), e.g. 3 GHz-6 GHz for a 3 GHz bandwidth, via the pulse bundle strategy. This allows for lower power consumption of the circuit blocks after pulse down-conversion, while still allowing for an ultra-wide bandwidth spectrum to be used for communications.

A5: Quasi Low-IF Architecture wherein an intermediate frequency (IF) stage that operates with a quasi-low-IF architecture is employed in order to circumvent DC offset problem, reduce 1/f noise of the radio frequency (RF) section, and reject typical narrowband interference, e.g. signals with BW<50 MHz, in order to increase system robustness and interference rejection. As part of this, self-mixing of the RF signal is utilized to down-convert it to DC, and high pass decoupling capacitors are specified to ensure that an insignificant amount of the desired pulse energy is cut-off during this process, while a significant amount of the narrowband interferer energy is cut-off. This is coupled with a second squaring stage after the IF stage so as to retain full sensitivity. As the signal is not directly down-converted to low-IF but high pass filtered to remove its DC content, this architecture is labeled as "quasi low-IF".

However, within other embodiments of the invention this IF filter which is high pass may also be a band pass filter with appropriate characteristics. Either the band pass or high pass IF filters may be implemented as a passive filter, active filter, or another type such as an n-path filter for example. If implemented with an n-path filter this has the advantage of allowing for some electronic tuning of the filter(s) and accordingly the n-path filter can create tunable notches to remove blocking transmitter/signals (blockers).

A6: Gaussian Pulse Shaping accomplished by the power amplifier via exploitation of its ground connection thereby allowing a transmitter according to embodiments of the invention to operate on digital glitches in its entirety, allowing for an all-digital structure with negligible static current consumption.

A7: Fully Digital Transmitter Architecture allowing for very aggressive power cycling, for example at the pulse-level.

A8: Parallelized ADC/Integrator Structure allowing for faster synchronization and enhanced interference detection. This structure allows for full signal observability during the receive timeframe whilst also allowing for dynamically changing modulation schemes, e.g. On-Off Keying (OOK) and Pulse-Position Modulation (PPM) in order to improve robustness of communications based on the channel or regulatory environment.

A9: Multiphase Baseband Clock utilization within a transceiver, for example, in order to reduce clock frequency, e.g. 20 MHz instead of 200 MHz and enhance power efficiency.

A10: Double-Squaring Signal Detection-Rejection for the enhancement of the energy detection sensitivity/noise rejection in the receiver and the generation of a rectified signal well-suited for simple integration. This double squaring method takes advantage of the impulse nature of the received signals in order to enhance detection, effectively via non-linear processing of each impulse. One squaring operation down-converts the pulse to the quasi low-IF while a second squaring operation allows the use of the entire down-converted pulse energy to increase the probability of detection instead of solely employing the detected amplitude/peak as performed within prior art impulse radio receivers. As previously noted in A5, high-pass filtering between the two squaring operations gives rise to DC offset mitigation, reduction of 1/f noise, and narrowband interference rejection of the quasi low-IF architecture proposed.

Accordingly, embodiments of the invention provide for very high energy efficiency, in the range of <1 nJ/bit) through a combination of circuit and system architectures and methods. The invention also allows maintaining this energy efficiency over a wide range of data rates, which is not possible within prior art radios. Such efficiency should enable many solutions previously impossible or not well serviced by conventional radios. For instance, longer battery lifetime of wearables will be made possible. Beneficially, applications of the inventors' novel technology can also impact wireless implantable biomedical applications where power budgets are severely limited. Further, the robustness of impulse radios according to embodiments of the invention to interference and fading through their pulse based operation and real-time spectrum agility can make it attractive for applications such as the aerospace, automotive or military sectors, structural health monitoring or home automation for example.

A2: Exemplary Impulse Radio Applications

The increased efficiency of transmitter/receiver/transceiver systems according to embodiments of the invention increases the feasibility of self-powered wireless sensor networks that operate from energy harvested from the environment such as solar, vibration, temperature etc., rather than from batteries where available power is limited, especially in compact, small footprint sensors. The efficacy of a UWB transceiver having a footprint of a few square millimeters is negated by requiring tens of square centimeters of solar cell to power it. Embodiments of the invention have been implemented by the inventors exploiting a submicron CMOS transceiver design through a commercial foundry.

For example, considering FIG. 1A there are depicted examples in first to third images 100A to 100C examples of current wearable devices including, but not limited to, smart watches, activity trackers, smart shirts, pressure sensors, and blood glucose sensors that provide biometric data relating to the user of said wearable device(s). Within first image 100A examples of wearable devices are depicted whilst within second image examples of smart clothing are depicted. Third image 100C depicts an example of a wearable device presenting information to a user in contrast to the devices/clothing in first and second images 100A and 100B respectively that collect contextual, environmental, and biometric data.

Smart clothing may be made from a smart fabric and used to allow remote physiological monitoring of various vital signs of the wearer such as heart rate, respiration rate, temperature, activity, and posture for example or alternatively it refers to a conventional material with embedded sensors. A smart shirt may, for example, record an electrocardiogram (ECG) and provide respiration through inductance plethysmography, accelerometry, optical pulse oximetry, galvanic skin response (GSR) for skin moisture monitoring, and blood pressure. Information from such wearable devices may be stored locally or with an associated device, e.g. smartphone, as well as being stored remotely within a personal server, remote cloud based storage, etc. and communicate typically via a wireless network such as Bluetooth, RF, WLAN, or cellular network although wired interfaces may also be provided, e.g. to the user's smartphone, laptop, or dedicated housing, allowing data extraction as well as recharging batteries within the wearable device. However, compact, non-intrusive, small volume wearables generally require that the battery be small as in many instances this component determines the wearable volume when user interfaces are not required. Hence, minimizing the battery whilst maximizing lifetime of the wearable before replacement of the battery, re-charging the battery, or complete replacement of the wearable is of significant benefit to the user and a marketing/commercial lever for the wearable manufacturer.

Also depicted in FIG. 1A are fourth and fifth images 100D and 100E respectively of sensors and electronic devices providing biometric data relating to a user. For example, within fourth image 100D a user's smart clothing provides data from sensors including, but not limited to, those providing acoustic environment information via MEMS microphone 105, user breathing analysis through lung capacity sensor 110, global positioning via GPS sensor 115, their temperature and/or ambient temperature via thermometer 120, and blood oxygenation through pulse oximeter 125. These are augmented by exertion data acquired by muscle activity sensor 130, motion data via 3D motion sensor (e.g. 3D accelerometer), user weight/carrying data from pressure sensor 140 and walking/running data from pedometer 145. These may be employed in isolation or in conjunction with other data including, for example, data acquired from medical devices associated with the user such as depicted in fifth image 100E in FIG. 1A. As depicted these medical devices may include, but are not limited to, deep brain neurostimulators/implants 150, cochlear implant 155, cardiac defibrillator/pacemaker 160, gastric stimulator 165, insulin pump 175, and foot implants 180. Typically, these devices will communicate to a body area aggregator, e.g. smartphone or dedicated wearable computer. Accordingly, it would be apparent that a user may have associated with themselves one or more sensors, either through a conscious decision, e.g. to wear a blood glucose sensor, an unconscious decision, e.g. carrying an accelerometer within their cellphone, or based upon an event, e.g. a pacemaker fitted to address a heart issue. In the majority of these the data transmission from a wearable device to a PED/FED is generally low, e.g. periodic biometric data etc., although in some instances such as smart glasses transmission/receipt of continuous and/or larger volumes of data may be required. Even continuous data acquisition such as heart monitoring, for example, may be transmitted in burst mode as the amount of data even for a minute is not large. However, if the minimal burst payload is too large or wakeup/sleep times are too long, true real-time information about the sensor being wirelessly monitored will not be achievable without sacrificing efficiency. Accordingly, a highly energy efficient radio capable of maintaining sub nJ efficiency for multiple data rates (i.e., in this example, very low data rates) such as that enabled by the embodiment of this invention is highly desirable.

Figure 1B:
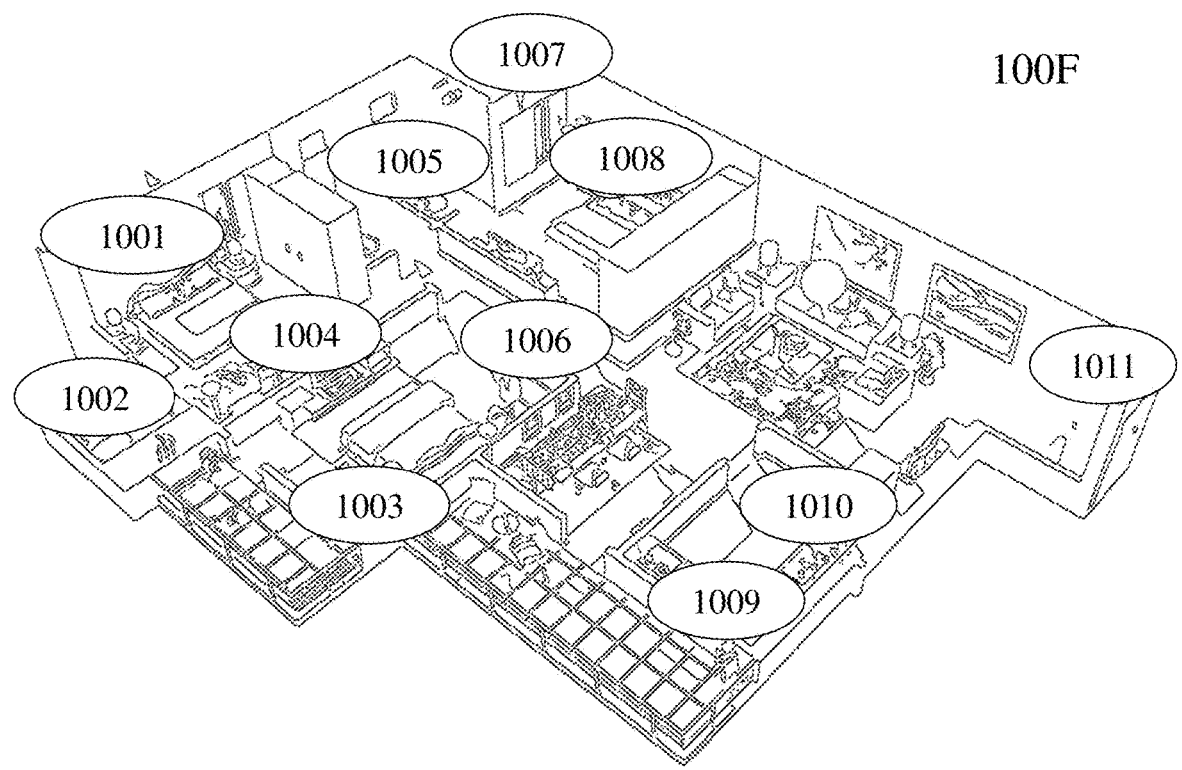
FIG. 1B depicts examples of wireless technology according to embodiments of the invention supporting home automation and location services.
Figure 1B:
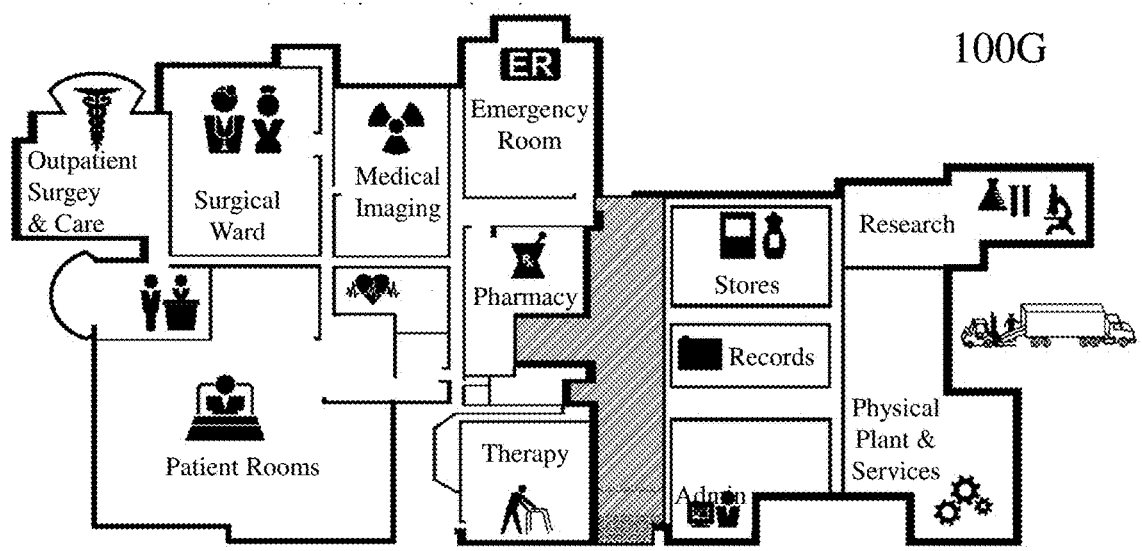

Now referring to FIG. 1B there are depicted first and second environments 100F and 100G respectively relating to examples of deployment scenarios for wireless impulse radios according to embodiments of the invention relating to enhancing residential automation and wireless interconnect in first environment 100F or providing wireless location services of people, equipment, medical supplies in second environment 100G. Considering, first environment 100F then a series of deployment scenarios are depicted including Air Conditioning 1001, Energy Saving—Efficiency 1002, Surveillance 1003, Entertainment 1004, Timer 1005, Lighting 1006, Motor Control 1007, Environment 1008, Sprinkler 1009, Appliances 1010, and Security 1011. In the majority of these the requirements for data transmission/receipt is again quite limited and aperiodic. Similarly, in the second environment 100G depicting a simplistic schematic of a hospital wireless based location services, inventory tracking services etc. can range from tracking patients to hospital equipment such as trolleys, diffusion pumps, etc. through to medical device connectivity, such as patient monitors, electrocardiograms (EKGs), etc. and medical consumables etc. Again data rates are typically low but in addition there may be a large number of concurrently operating devices within a small area where interference is unacceptable.

B: Multi-Pulse Spectral Agility

The inventors have established a design methodology for impulse radio based on pulse bundles as indicated in Section A3 which have multiple pulses per bundle with real-time configurable parameters, phase, frequency, amplitude, and bandwidth in order to dynamically fill the UWB spectrum. UWB communications allow for transmission using a wide frequency band provided that the spectral mask of the appropriate regulatory body is adhered to. For example, in the United States the allocated frequency band is 3.1 GHz$\leq$f$\leq$10.6 GHz, and the Federal Communication Commission (FCC) dictates the spectral mask with respect to maximum transmitted power in different sub-bands across this allocated frequency band. This enables pulsed operation, which has the advantage of low power consumption, since a transceiver can be duty-cycled to consume power only when a pulse is to be transmitted or received. Since the spectral mask allows for a fixed maximum power spectral density for transmissions, it is advantageous to maximize the occupied bandwidth in order to maximize the symbol energy and extend the range achievable by a wireless link. However, using a single pulse for communication causes a trade-off between the pulse bandwidth and the required synchronization accuracy since an increase in pulse bandwidth corresponds to a decrease in pulse duration, resulting in a more challenging and potentially costlier circuit implementation with increased energy needed for synchronization.

Figure 2A:
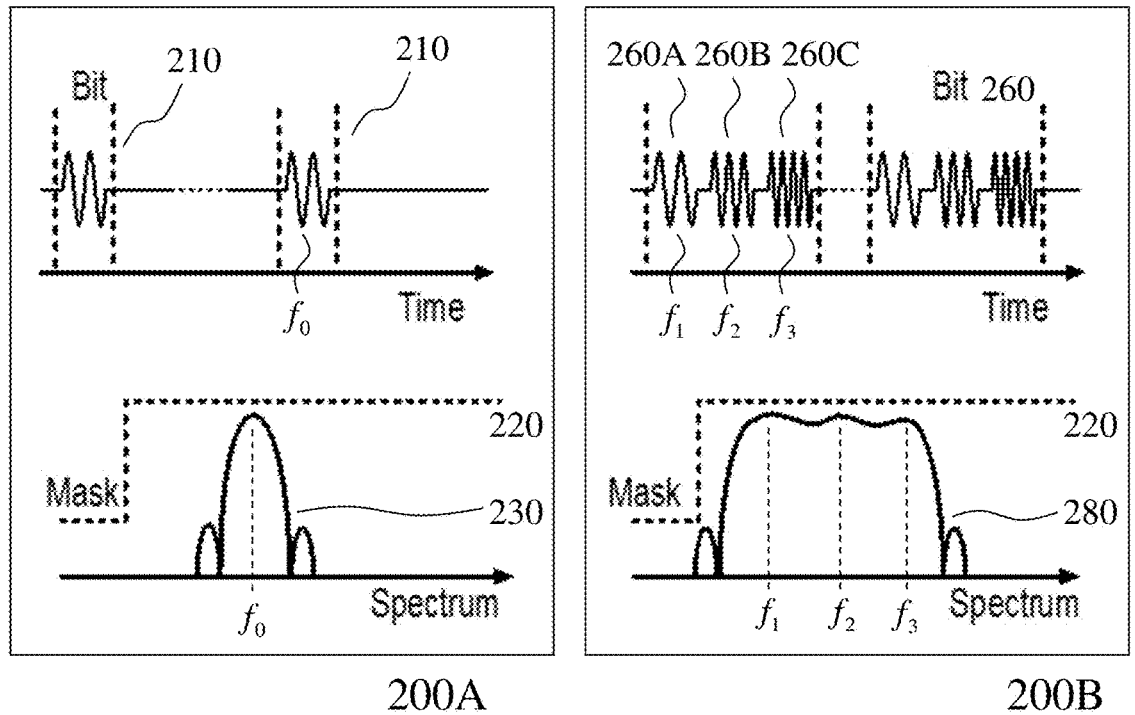
FIG. 2A depicts a single-pulse UWB protocol according to the prior art together with a multi-pulse symbol UWB protocol according to an embodiment of the invention.
Figure 2B:
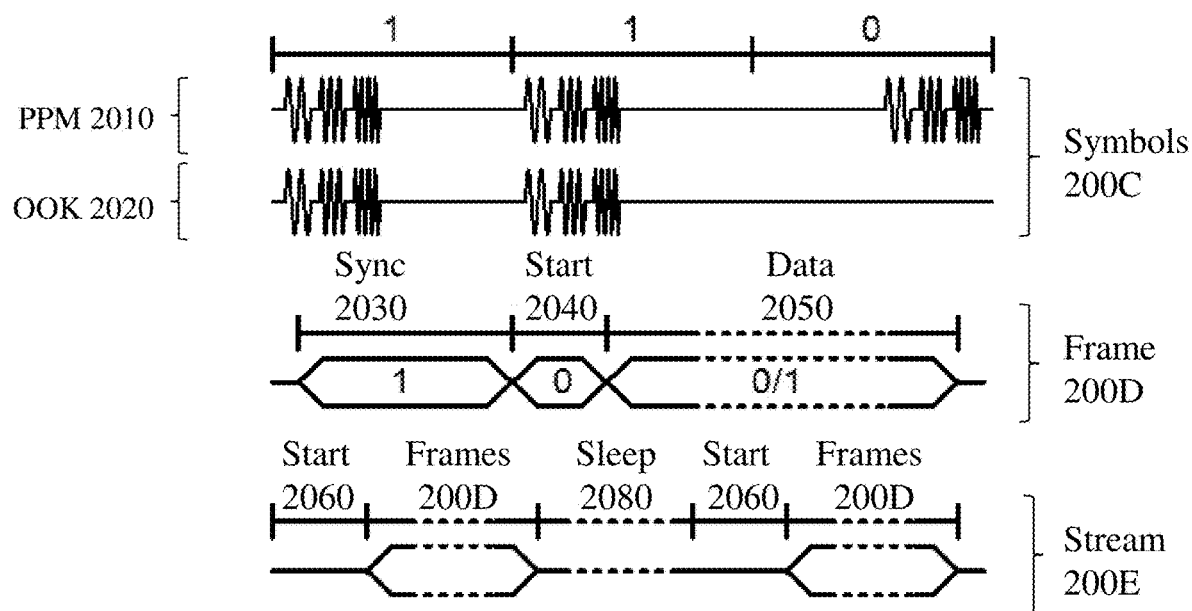
FIG. 2B depicts symbol, frame, and stream structures for a multi-pulse symbol UWB protocol according to an embodiment of the invention.

The inventors address this trade-off and remove it through the conceptual step of applying multiple pulses with different frequency spectrum to the generation of a bit. Referring to FIG. 2A in first image 200A there are depicted time and frequency domain schematics for a prior art impulse radio wherein each bit 210 is a pulsed oscillation at a single frequency such that the frequency spectrum is a single peak 230 centered at $f_0$ within the frequency range allowed by the regulatory authority UWB mask 220 and below the maximum power within that frequency range. In contrast as depicted in second image 200B, as is depicted in FIG. 2B, exploits bits 260 which comprise a series of sub-pulses 260A to 260C which are each at frequencies $f_1$; $f_2$; $f_3$. Accordingly, the multi-pulse spectrum 280 of a symbol (bit 260) is obtained conceptually (phase scrambling is omitted for clarity) by summing the individual pulse spectra of the sub-pulses 260A to 260C, which increases the bandwidth while increasing the total symbol duration, in contrast with the single-pulse prior art method, whilst maintaining the maximum power below the UWB mask 220. This allows the symbol energy to be maximized while relaxing the timing requirements and level of synchronization required at the receiver. An arbitrary number of pulses with different sets of parameters may be included within a bundle to tailor the pulse spectrum to a given requirement.

In order to provide the most signal energy without violating the emission mask, the phase of the pulses must be randomized, i.e. the spectrum needs to be whitened to avoid the generation of "spectral lines" generally found in periodic signals, and the correlation between pulses has to be reduced to ensure that the multi-pulse spectrum is the sum of the individual pulse spectra. This can be performed by applying a pseudo random noise (PRN) sequence to the phase modulation in the power amplifier of the transmitter. Since the receiver is not sensitive to the phase of the signal (due to its non-coherent detection scheme, as will be described later), no phase synchronization between transmitter and receiver is required in order to achieve this.

The precise spectral shape of the transmitted signal can be controlled by generating pulses with different frequencies and durations in each symbol. The symbol or bit is referred to as comprising a "pulse bundle" by the inventors. The spectrum of the pulse bundle is easily calculated, as its power is the sum of the individual pulse power spectra. This allows for easy dynamic reconfigurability in response to changes in the environment or user demands, and also allows operation across different regulatory environments.

Due to the pulsed nature of the signal, out-of-band spectral sidelobes are present. Even though pulse shaping reduces the sidelobe level, the maxima of the sidelobes can be several dBs above the average out-of-band power spectral density. By applying a PRN sequence to the least significant bit (LSB) of the duty cycling control bit, the width of each pulse may be randomly dithered. This equivalently dithers the location of sidelobes and nulls in the out-of-band spectrum, thus effectively whitening the out-of-band spectrum to its average value and increasing the margin towards the FCC spectral mask.

Modulation of the wideband data stream can be achieved through On-Off Keying (OOK) or Pulse Position Modulation (PPM), for example, as is shown in FIG. 2B. In OOK modulation 2020, the presence of a pulse bundle indicates a "1", and the absence of a bundle indicates a "0". This is a lower power communication scheme since the transmitter only needs to be active when a "1" is to be sent, and can remain in sleep mode when the data bit is a "0". This can also increase the communications range since data is only being transmitted roughly half of the time (ensured by appropriate data coding), which means each pulse bundle can contain more energy and still meet the emissions mask imposed by the regulatory body.

However, OOK modulation requires a defined threshold in order to make a decision as to whether the received data was a "1" or a "0". This can reduce performance in environments with rapid changes in either the channel characteristics or the level of interfering signals. In these situations, PPM modulation 2010 may be preferred as an alternate modulation scheme, for example. In this case, it is the location of the pulse bundle within the symbol period that determines whether a "1" or a "0" was received. The detector in essence compares the energy received in the first half of the symbol period to that received in the second half of the symbol period to make a decision, thus creating a frame-level threshold that can compensate for rapidly changing environments. The ability to switch between OOK and PPM modulation within the same transmitter—receiver pair within embodiments of the invention is made possible by using a burst-mode communications scheme with the parallel digitization architecture later detailed.

Accordingly, in FIG. 2B there are depicted the symbols 200C for the PPM 2010 and OOK 2020 modulation schemes. Further, a frame structure 200D is depicted wherein each frame 200D is preceded by a synchronization block 2030 in order to achieve fine synchronization in the receiver, as well as a start bit 2040 to correct for drift in the symbol synchronization before the data 2050 is transmitted/received. Due to the simple synchronization structure, only a short synchronization block 2030 is required, reducing its overhead on the effective data rate of the system. Between frames 200D, the transmitter and receiver are powered down in order to reduce power consumption. This yields a stream 200E having a resulting structure of start 2060, frame 200D, and sleep 2080.

Such a transmission protocol is also well suited for reconfigurable data rates. As an illustrative example of the system operation, assume a data rate of 1 Mbps, a frame size of 1 kbit, and a burst data rate of 20 Mbps, e.g. within a frame a symbol is sent every 50 ns. In this example, each frame would have a duration of 50 µs. To achieve a 1 Mbps data rate, the frame repetition rate would be 1 kHz, i.e. a frame is sent every 1 ms. This means the receiver would only be active for 50 µs every 1 ms, leading to a duty-cycle of 5%. To achieve a 100 kbps data rate with the same frame rate and duration, the only necessary change would be to reduce the frame repetition rate to 10 ms (i.e., a frame sent every 10 ms). Now the receiver would only be active for 50 µs every 10 ms, leading to a duty-cycle of 0.5%. Thus, a 10× reduction in data rate would also lead to a 10× reduction in the power consumption. Within these examples, synchronization requirements were not considered. Thanks to the burst-mode communication scheme and the fact that both symbol- and frame-level synchronization are implemented, the synchronization overhead may be less than 1% of the data payload. A particularity of the impulse radio in this invention is that the payload may be of a very few bits since the wakeup/sleep times are very short, allowing the duty cycling of the impulse radio to be more aggressive than carrier-based radios. This can enable real-time (i.e., without payload buffering) transmission of very slow repeat rate payloads having a highly reduced number of bits. This ability is well-suited to many applications requiring real-time links that have low data throughput but highly restrictive energy constraints such as biomedical sensors.

C: Transmitter

Figure 3:
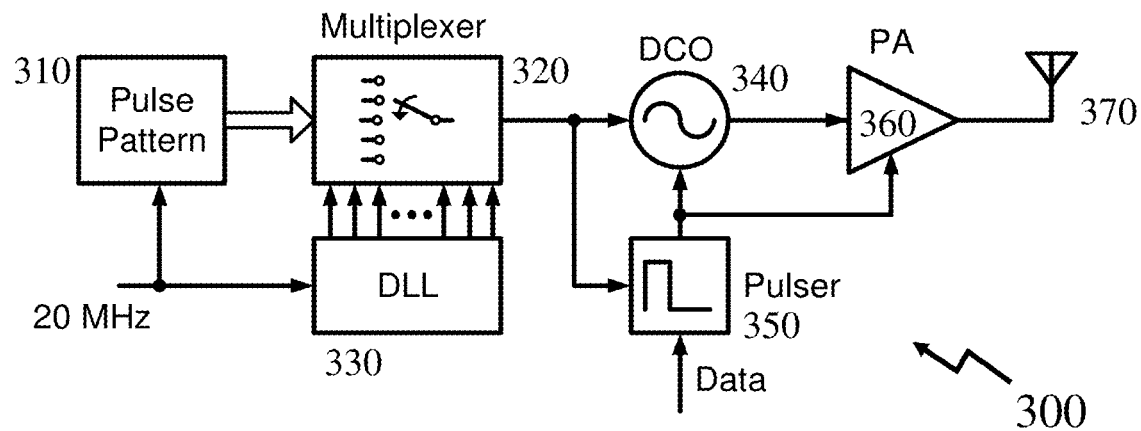
FIG. 3 depicts a transmitter circuit schematic for a UWB transmitter/transceiver according to an embodiment of the invention.

Referring to FIG. 3 there is depicted a schematic of a transmitter 300 according to an embodiment of the invention. A Pulse Pattern block 310 holds the configuration for the pulses used to represent the current symbol. From the symbol-rate clock (i.e. 20 MHz), multiple phases are generated by a Delay Locked Loop (DLL) 330. The rising edge of each clock phase represents the start of one pulse in the symbol pulse bundle. A multiplexer 320 is triggered by the edges of the clock phases and selects the configuration of the current pulse out of the Pulse Pattern block 310. A pulse generator (Pulser) 350 generates pulses with a pulse width set by the multiplexer 320 and enables the Digitally Controlled Oscillator (DCO) 340 and Power Amplifier (PA) 350. When enabled, the DCO 340 generates a Gaussian shaped pulse with frequency set by the multiplexer 320, which is then amplified by the PA 360 and radiated by the antenna 370.

Accordingly, the Pulse Pattern block 310 establishes the pulses for a symbol or sequence of symbols. In this manner updating the Pulse Pattern block 310 adjusts the pulse sequence employed for each symbol and accordingly the Pulse Pattern block 310 may be dynamically updated based upon one or more factors including, but not limited to, network environment data, predetermined sequence, date, time, geographic location, signal-to-noise ratio (SNR) of received signals, and regulatory mask.

C1. Transmitter Pulse Generation and Shaping

Within embodiments of the invention the DCO 340 output may be shaped to provide a predetermined frequency and/or amplitude characteristic discretely or in combination with the action of the Pulser 350. For example, within embodiments of the invention described within this specification the use of Gaussian shaping and a method of shaping Gaussian pulses are presented and employed. However, in other embodiments alternate shaping methodologies and shape profiles may be employed.

The embodiment exploited by the inventors within this specification employs shaping the pulse via the PA 360 through adjustment of its ground connection. This allows the transmitter to operate in the digital domain in its entirety, allowing for an all-digital structure with negligible static current consumption. Further, the use of a fully digital transmitter structure allows for very aggressive power cycling, i.e. at the pulse-level.

C2. Ground-Switched Power Amplifier

The pulsed nature of UWB transmissions requires a power amplifier (PA) capable of delivering a high instantaneous power level with pulse shaping to reduce the sidelobes of the pulse spectrum. High power efficiency, efficient power cycling and fast wakeup/sleep transition times are required to achieve low average power consumption.

Figure 4:
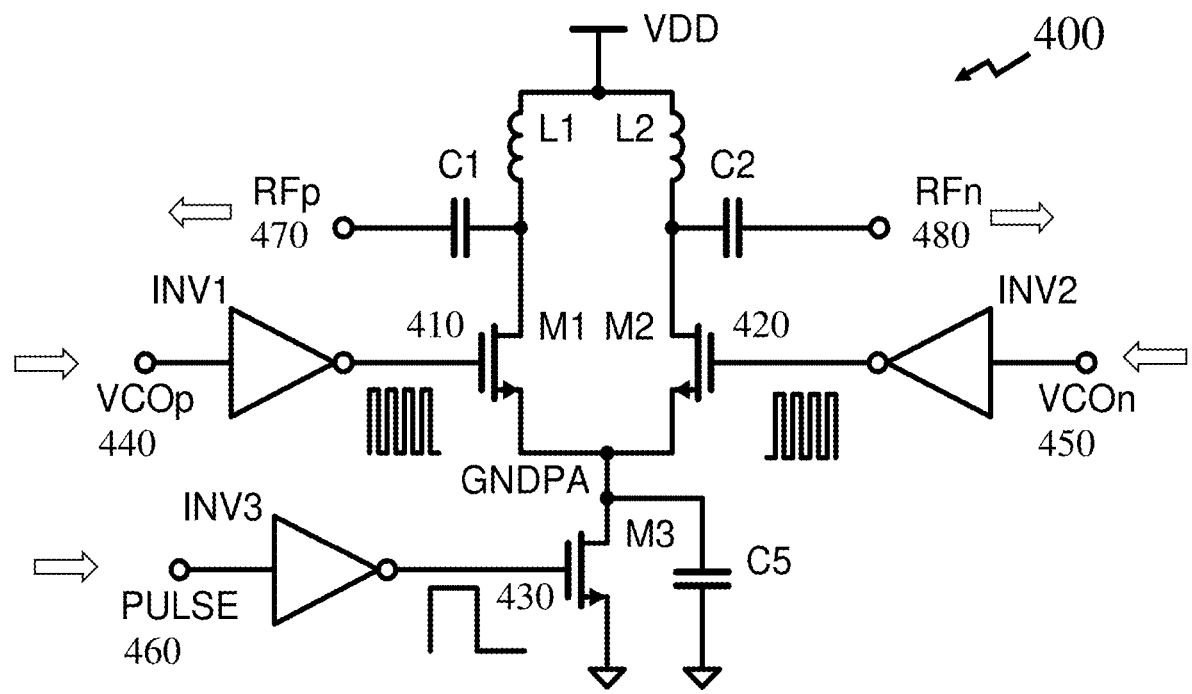
FIG. 4 depicts a ground-switch power amplifier circuit schematic for a UWB transmitter/transceiver according to an embodiment of the invention.

A switching power amplifier (SW-PA) 400 as depicted in FIG. 4 has been adopted within the embodiment of the invention presented within this specification in order to transmit the UWB pulse bundles. SW-PA 400 therefore representing an embodiment of the PA 360 in FIG. 3. As depicted first and second transistors M1 410 and M2 420 act as switches whose inputs are complementary digital clocks generated by the DCO, allowing a fully-differential SW-PA 400 to be realized. The frequency of these digital clocks sets the center frequency of each individual pulse in a pulse bundle, and the pulse enable signal applied to third transistor M3 430 sets the duration of each pulse. Accordingly, the complementary digital clocks are provided by $VCO_P$ 440 and $VCO_N$ 450 whilst the pulse enable/pulse duration is the pulsed signals provided by the Pulser 350 which is coupled to PULSE 460 such that the SW-PA 400 ground connection via third transistor M3 430 is modified by this signal. The SW-PA 400 outputs being provided at $RF_P$ 470 and $RF_N$ 480 with the SW-PA 400 coupled to a power rail $V_{DD}$.

The functionality can be described by considering only the left side (half circuit) of the differential SW-PA 400 since the symmetry forces the operation of the other side to be identical. The SW-PA 400 output, in this instance $RF_P$ 470 is connected to the $GND_{PA}$ node when the first transistor M1 410 M1 is ON. Since the DC voltage of the SW-PA 400 output is $V_{DD}$ (through the inductor $L_1$), the SW-PA 400 output becomes $V_{DD}+(V_{DD}-GND_{PA})=2\times V_{DD}-GND_{PA}$ when the first transistor M1 410 M1 is OFF. Combining these two cases yields an output swing of $2\times V_{DD}-GND_{PA}$. Hence, by shaping the voltage of the $GND_{PA}$ node, the SW-PA 400 output can be a directly shaped version of the clock signal to generate the output pulse. By design, the output pulse is shaped by the third transistor M3 430 and C5 to realize a Gaussian profile for optimum balance between the pulse duration and bandwidth, and to minimize the sidelobe power in the pulse spectrum. The SW-PA 400 generates an output pulse when activated by the third transistor M3 430, which serves as an enable switch to ensure the power amplifier only consumes static power.

C3. Digitally Controlled Oscillator

Figure 5:
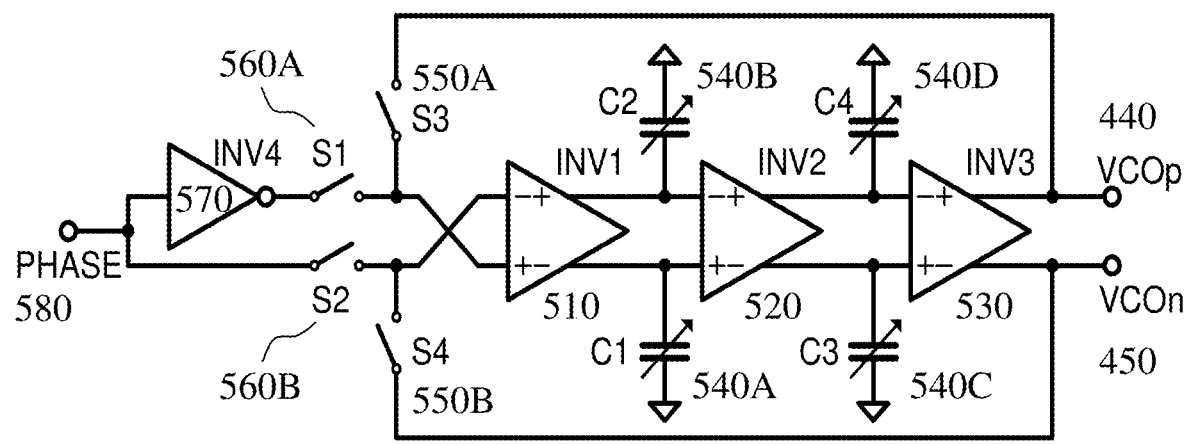
FIG. 5 depicts a digitally controlled oscillator circuit schematic for a UWB transmitter/transceiver according to an embodiment of the invention.

A fully differential ring DCO (FDR-DCO) 500 as depicted in FIG. 5 has been adopted within the embodiment of the invention presented within this specification and as such FDR-DCO 500 therefore represents an embodiment of the DCO 340 in FIG. 3. FDR-DCO 500 provides the digital clock to the first and second transistors M1 410 and M2 420 with SW-PA 400 in FIG. 4 and is fed with the output of Pulser 350 in order to toggle its operation and generate the clock that is fed to the SW-PA 400. The frequency of this FDR-DCO 500 is set by the first and second capacitor banks, comprising first and second capacitors C1 540A and C2 540B and third and fourth capacitors C3 540C and C4 540D respectively, which are connected to the outputs of the first and second fully-differential inverters INV1 510 and INV2 520 respectively. The output from the third fully-differential inverter INV3 530 provides the complementary digital clocks $VCO_P$ and $VCO_N$ which are coupled to $VCO_P$ 440 and $VCO_N$ 450 of the SW-PA 400.

Accordingly, within an embodiment of the invention, first to fourth capacitors C1 540A to C4 540D have identical capacitance values and each is a programmable capacitor bank with 4 bits of programmability although other levels of programmability etc. may be employed. Third and fourth switches S3 550A and S4 550B are used to turn off the FDR-DCO 500 and save power when no pulse is to be sent. Fourth inverter INV4 570 in conjunction with first and second switches S1 560A and S2 560B pre-charge the oscillator nodes before oscillation (when FDR-DCO 500 is off), to control the polarity of the pulse for phase modulation. This also creates an oscillator with a very fast startup time (on the order of a fraction of ns), leading to increased power cycling efficiency in the transmitter. When a pulse is to be generated, the FDR-DCO 500 is enabled by opening first and second switches S1 560A and S2 560B and closing third and fourth switches S3 550A and S4 550B, whilst at all other times the FDR-DCO 500 is in a low power sleep state. Optionally, an additional PMOS transistor may be added between the $GND_{PA}$ and $V_{DD}$ nodes of the SW-PA 400 in order to quickly switch off the SW-PA 400 at the end of the pulse and improve the pulse shaping.

C4. Pulse Generator

Figure 6:
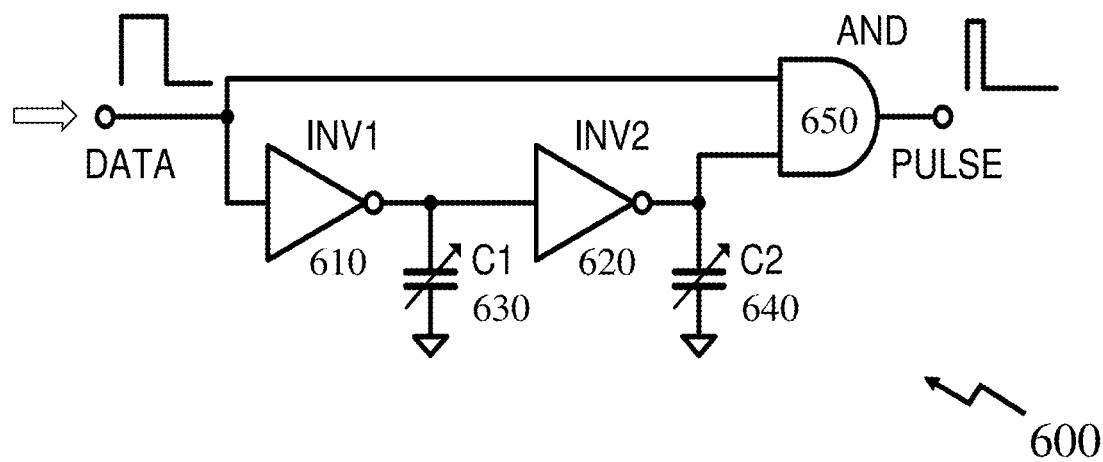
FIG. 6 depicts a pulse generator circuit schematic for a UWB transmitter/transceiver according to an embodiment of the invention.

A pulse signal from the Pulser 350 coupled to the DCO 340, e.g. FDR-DCO 500, and PA 360, e.g. SW-PA 400, is generated using a pulse generation circuit. Accordingly, pulse generator (PULGEN) 600 as depicted in FIG. 6 has been adopted within the embodiment of the invention presented within this specification and as such PULGEN 600 therefore represents an embodiment of the Pulser 350 in FIG. 3. As depicted an input signal is routed directly and indirectly via first and second inverters INV 1 610 and INV2 620 to an AND gate 650. The first and second inverters INV 1 610 and INV2 620 are part of a variable delay circuit in combination with first and second capacitors C1 630 and C2 640 which are programmable capacitor banks, although other levels of programmability etc. may be employed.

Accordingly, a rising edge on the DATA line causes this circuit to create a pulse on the order of ns. The pulse width is a function of the variable delay created by the first and second capacitors C1 630 and C2 640, which through being digitally tunable allow the pulse width to be digitally programmed.

C5. Transmitter Output

Figure 7:
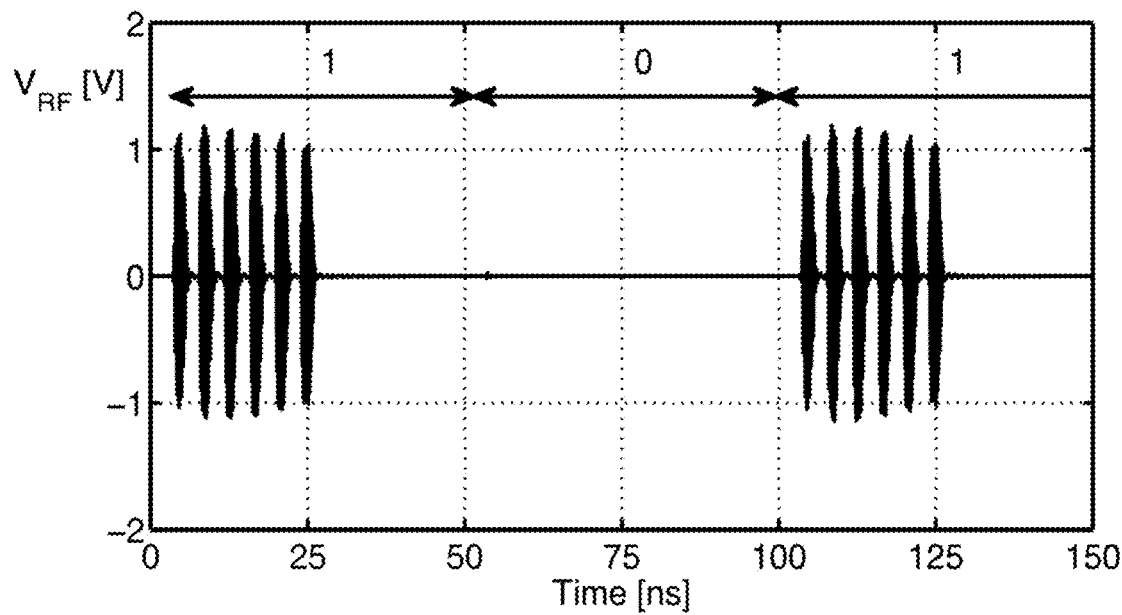
FIG. 7 depicts transmitter output voltage for a 6-pulse bundle per bit implementation of a UWB protocol and UWB transmitter/transceiver according to an embodiment of the invention.

Now referring to FIG. 7 there is depicted the output voltage of the PA 360 in transmitter 300 for a submicron CMOS prototype implementation employing a 6-pulse bundle with On-Off-Keying (OOK) modulation. As noted supra a "0" or "1" symbol is represented by the presence or absence of the pulse bundle. As evident each bundle consists of a number (in this instance 6) of Gaussian shaped pulses with configurable pulse width and frequency.

Figure 8:
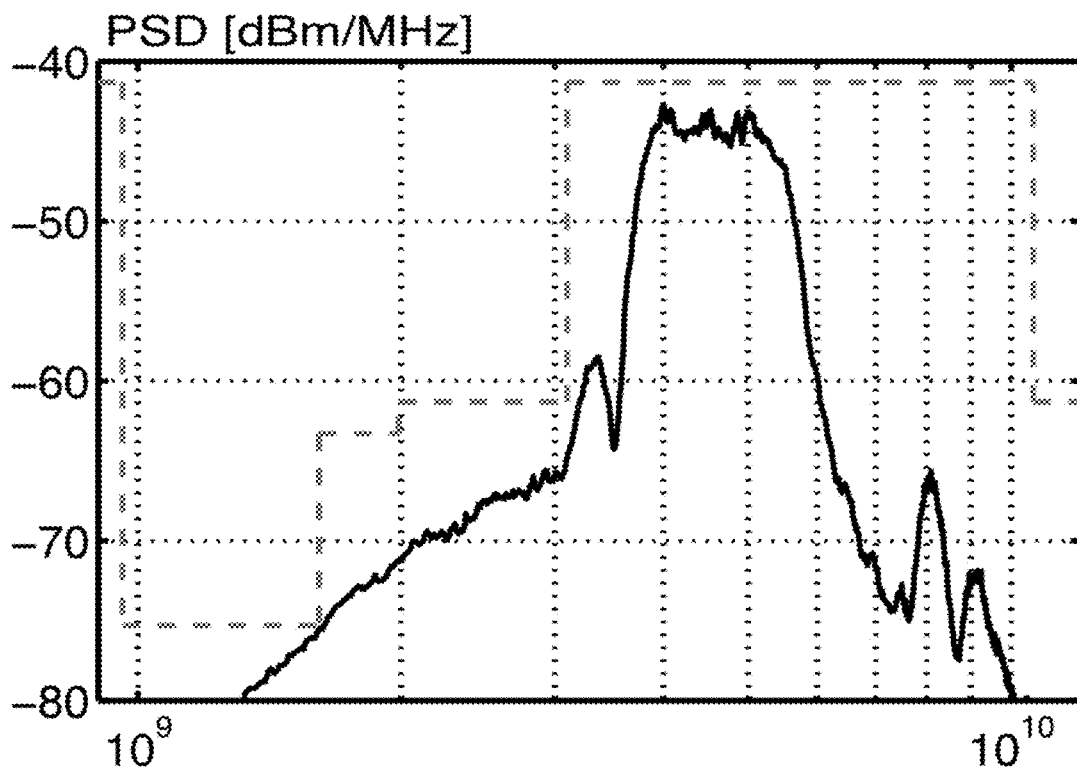
FIG. 8 depicts transmitter output spectrum with a UWB protocol and UWB transmitter/transceiver according to an embodiment of the invention.

The resulting typical frequency spectrum of the transmitter output at the PA 360 in transmitter 300 for a submicron CMOS prototype implementation is shown in FIG. 8. The energy in the spectrum is concentrated in the UWB band as dictated by the FCC, and respects the set spectral mask yet at the same time occupies approximately 2 GHz of the FCC regulated spectrum for UWB.

The fully digital structure of the transmitter allows for intrinsic power cycling at the pulse level. The DCO 340 and pulse generator (Pulser) 350 are designed with digital gates such that they only consume dynamic power when data is being transmitted. Additionally, the switched nature of the PA automatically turns it off when it is not transmitting a pulse, resulting in low static power consumption. This creates a very efficient transmitter since no extra power cycling hardware is required.

D. Receiver

Figure 9:
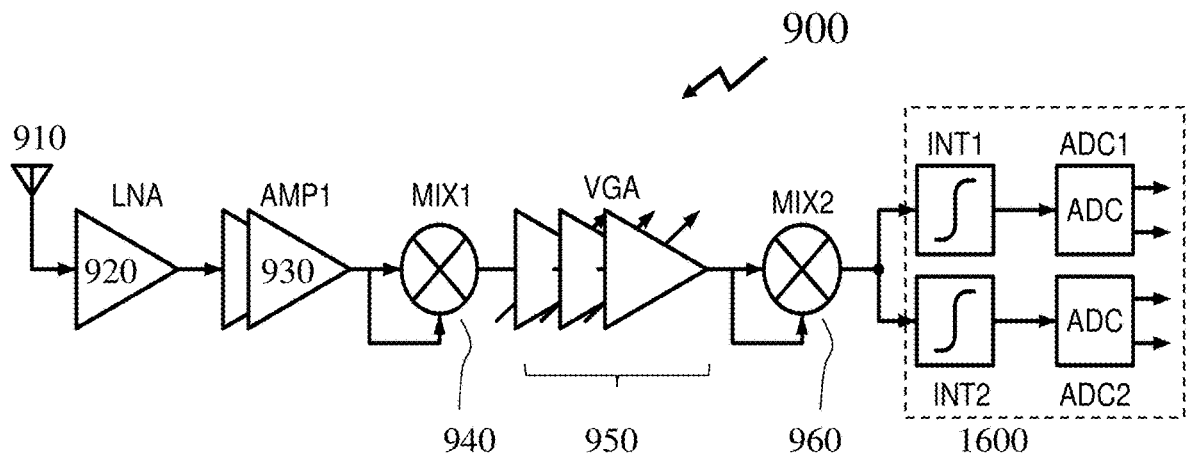
FIG. 9 depicts a receiver circuit schematic for a UWB receiver/transceiver according to an embodiment of the invention.

Referring to FIG. 9 there is depicted a schematic of a receiver 900 according to an embodiment of the invention. The RF signal from the antenna 910 is initially amplified by a Low Noise Amplifier (LNA) 920 before being passed to a two stage RF amplifier (AMP1) 930. A first squaring mixer (MIX1) 940 multiplies the signal with itself to convert to the Intermediate Frequency (IF). A three-stage Variable Gain Amplifier (VGA) 950 amplifies the signal further and implements a bandpass filter function. The VGA 950 output is then coupled to a second squaring mixer (MIX2) 960 which down-converts the signal to the baseband frequency. A parallel integrator (INT1 and INT2) sums the signal energy, which is digitized by the Analog-to-Digital Converters (ADC1 and ADC2) within a digital processor (not depicted for clarity but described for example with respect to digital processor (DIGIPRO) 1600 below in respect of FIG. 16).

D1. Receiver Detection and Interference Rejection

The receiver IF chain utilizes an instantaneous bandwidth that is on the order of an individual pulse bandwidth, e.g. 500 MHz, whilst the total spectrum covers a much wider bandwidth, e.g. 3 GHz≤f≤6 GHz for a BW=3 GHz via the pulse bundle strategy. This allows for lower power consumption of the circuit blocks after pulse down-conversion, whilst still allowing for an ultra-wide bandwidth spectrum to be used for communications.

Receivers for UWB signals are challenging due to the wide bandwidth of the desired signal, which requires a high bandwidth receiver chain. Additionally, the occurrence of in-band narrowband interferers, DC offsets, and 1/f noise are also problematic in low power implementations. Accordingly, it would be desirable for the IF stage to:

operate with a quasi-low-IF architecture to circumvent the DC offset problem;

reduce 1/f noise of the RF section, and reject typical narrowband interference (e.g., signals with BW<50 MHz) in order to increase system robustness and interference rejection.

In order to achieve this, high pass decoupling capacitors are specified within the receiver 900 in order to ensure that an insignificant amount of the desired pulse energy is cut-off during this process. Further, this is coupled with a second squaring stage after the IF stage so as to retain full sensitivity. A double squaring method for the enhancement of the energy detection sensitivity/noise rejection in the receiver and the generation of a rectified signal is well-suited for CMOS integration. This double squaring method takes advantage of the impulse nature of the received signals in order to enhance detection as it effectively equates to a non-linear processing of each impulse. The first squaring operation down-converts the received pulse to the quasi low-IF signal whilst the 2nd squaring operation allows the use of the entire down-converted pulse energy to increase the probability of detection instead of just using the detected amplitude/peak as undertaken in other prior art impulse radio receivers. As mentioned, the high-pass filtering between the two squaring operations gives rise to DC offset mitigation, reduction of 1/f noise, and narrowband interference rejection.

It would be evident to one skilled in the art that beneficially the non-coherent receiver architecture presented in respect of FIG. 9 does not require frequency synchronization, or knowledge of the pulse phase/frequency pattern used by the transmitter.

D2. Low Noise Amplifier

Figure 10:
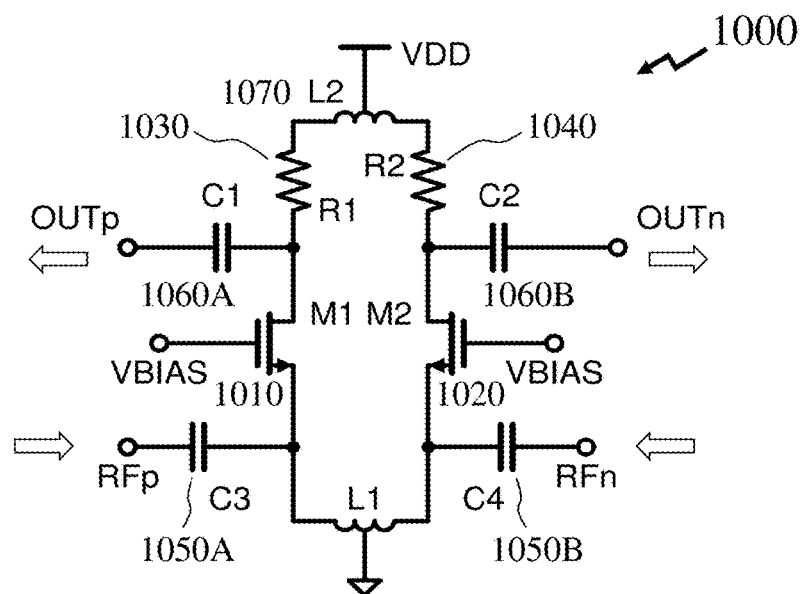
FIG. 10 depicts a low noise amplifier circuit schematic for a UWB receiver/transceiver according to an embodiment of the invention.

A low noise amplifier (LNA) 1000 as depicted in FIG. 10 has been adopted within the embodiment of the invention presented within this specification and as such LNA 1000 therefore represents an embodiment of the LNA 920 in FIG. 9. Differential input signals $RF_P$ and $RF_N$ are coupled through third and fourth capacitors C3 1050A and C4 1050B respectively to the drains of the pair of common-gate transistors M1 1010 and M2 1020 which are biased on their gates by $V_{BIAS}$ and whose bias current is sunk to ground via inductor L1. At the drains of M1 1010 and M2 1020, shunt peaking is performed by resistors R1 1030 and R2 1040 in conjunction with inductor L2 1070 in order to increase the bandwidth of the amplified signal. The signal is coupled out of the LNA 1000 by first and second capacitors C1 1060A and C2 1060B to the output ports $OUT_P$ and $OUT_N$.

D3. Squaring Mixer

Figure 11:
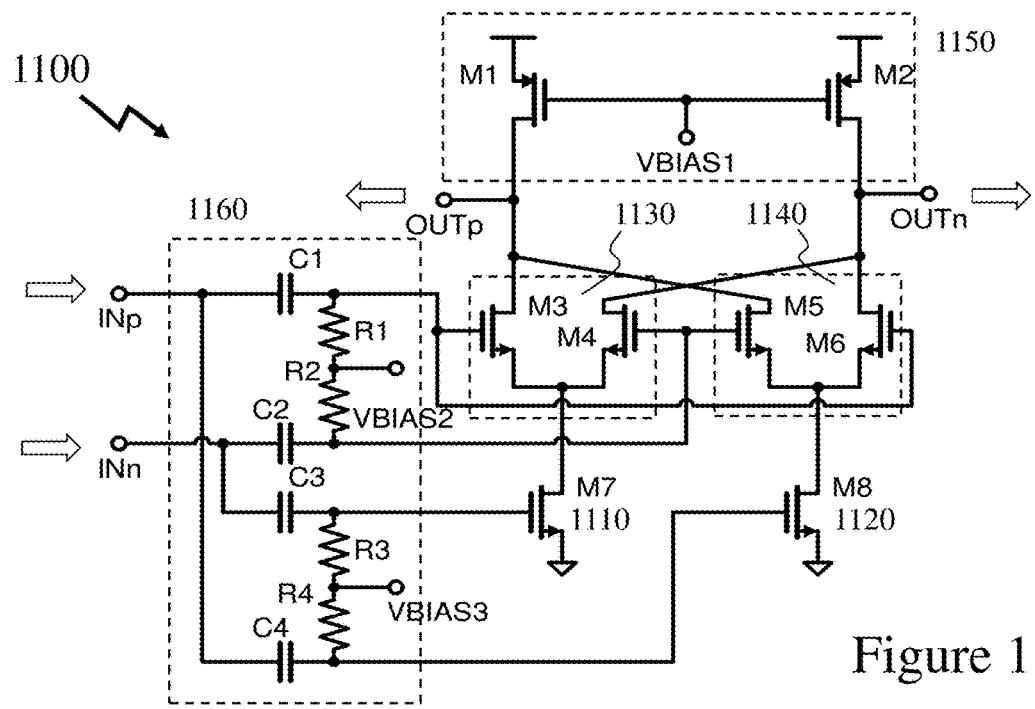
FIG. 11 depicts a squaring mixer circuit schematic for a UWB receiver/transceiver according to an embodiment of the invention.

A squaring mixer (SQ-MIX) 1100 as depicted in FIG. 11 has been adopted within the embodiment of the invention presented within this specification and as such SQ-MIX 1100 therefore represents an embodiment of the first and second squaring mixers MIX1 940 and MIX2 960 in FIG. 9. As depicted the differential input signals $IN_P$ and $IN_N$ are coupled to the gates of transistors M7 1110 and M8 1120, whose transconductances convert the signals into a differential drain current. Simultaneously, the input signals are also coupled to the cross-coupled transistor pairs M3:M4 and M5:M6, which steer the drain currents to either the positive ($OUT_P$) or negative ($OUT_N$) sides of SQ-MIX 1100, thereby multiplying the input with itself, i.e. squaring it. Transistors M1 and M2 are biased as current source 1150, to provide maximum voltage gain at the outputs. Biasing circuit 1160 coupled to the input signals and comprising capacitors C1 to C4 and resistors R1 to R4 ensures that the NMOS transistors are biased to the appropriate bias point.

D4. Variable Gain Amplifier

Figure 12:
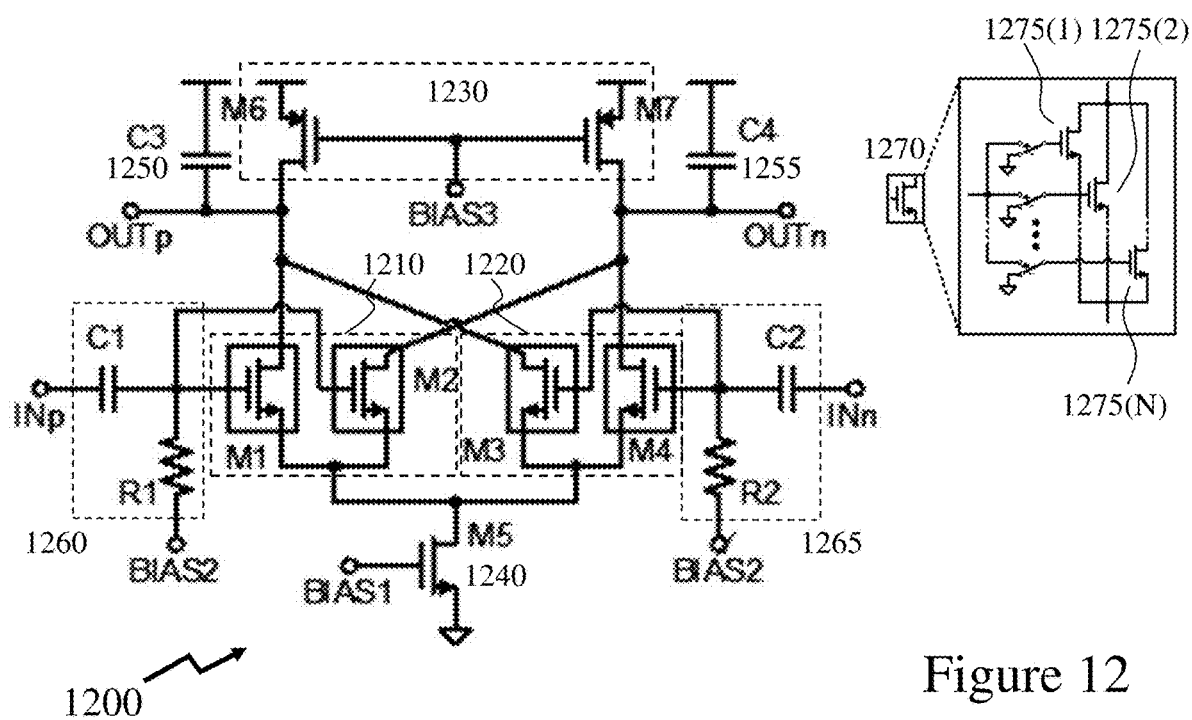
FIG. 12 depicts a variable gain amplifier circuit schematic for a UWB receiver/transceiver according to an embodiment of the invention.

A variable gain amplifier gain stage (VGA-GS) 1200 as depicted in FIG. 12 has been adopted within the embodiment of the invention presented within this specification and as such VGA-GS 1200 therefore represents an embodiment of each gain stage within the VGA 950 in FIG. 9. The differential input signals $IN_P$ and $IN_N$ are coupled to the gates of composite transistor pairs M1:M2 and M3:M4 respectively. Each composite transistor M1 to M4 as depicted in insert comprising a transistor array 1270 formed from an array of transistors 1275(1) to 1275(N) with connected sources and drains, and whose gates can be connected to either the signal or to ground depending on the switch positions. Accordingly, the composite transistor pairs M1:M2 and M3:M4 have switchable transconductance. The effective transconductance on the positive side ($OUT_P$) is equal to the difference of the transconductance of M1 and M3, and on the negative side ($OUT_N$) is equal to the difference in transconductance between M2 and M4. Therefore, the gain can be adjusted by the switch positions in the composite transistors. Transistors M6 and M7 are biased as current source 1230 to maximize the output voltage gain. Capacitor C3 and C4 perform low-pass filtering at the output nodes, while capacitors C1 and C2 together with bias resistors R1 and R2 perform high-pass filtering at the input nodes. The VGA-GS 1200 therefore operates with an effective bandpass filter response.

D5. Receiver Down-Conversion

Figure 13:
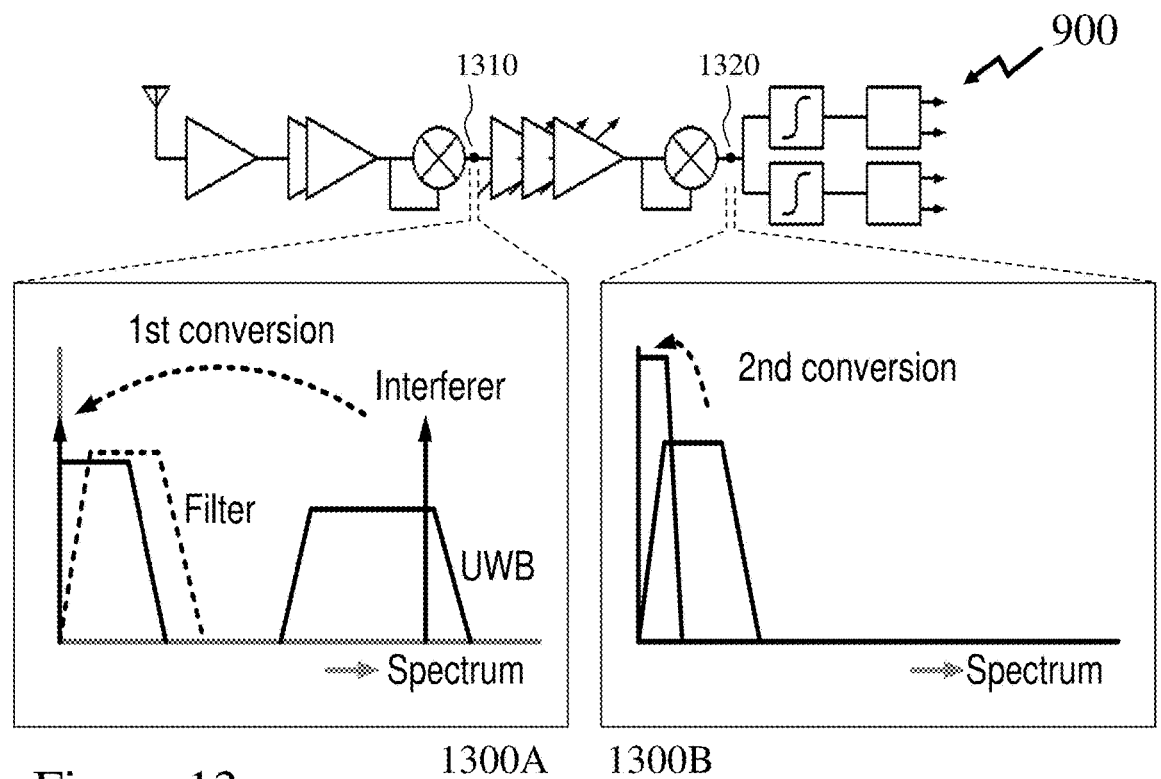
FIG. 13 depicts a dual-conversion methodology for a UWB receiver/transceiver according to an embodiment of the invention.

After the first down-conversion, via MIX1 940, any narrowband interference occupies a narrow frequency band close to DC ($f \leq 50$ MHz) whilst the UWB signal occupies a larger band (e.g. $f_{BW} = 500$ MHz), as can be seen in FIG. 13 with the idealized first spectral plot 1300A at first node 1310 in receiver circuit 900. The IF bandpass filter is designed to have a low frequency cutoff that is higher than the bandwidth of narrowband interferers (50 MHz) so these can be filtered out while removing only a fractional amount of UWB energy. With only the UWB signal remaining, the variable gain amplifier (VGA) amplifies the signal to the desired amplitude. The VGA can be AC-coupled due to the bandpass nature of the IF stage, which eliminates the need for DC offset cancellation and filters the 1/f noise generated by the IF stages.

For symbol demodulation, it is generally necessary to integrate the signal power over the symbol time in order to acquire the symbol energy. In this architecture, the IF bandpass filtering removes the DC component, preventing direct integration of the IF signal. Instead, a second down-converter performs a self-mixing operation to obtain the power that passed through the bandpass filter, effectively converting the IF signal around DC again. The second down-conversion process, via MIX2 960, being depicted with idealized second spectral plot 1300B at second node 1320 in receiver circuit 900 wherein the filtered down-converted UWB signal is down-converted again with a second conversion process. Subsequently, an integrator is employed to obtain the symbol energy wherein the adopted method has greater sensitivity than using peak detection at the IF level.

Accordingly, the double-square down-conversion architecture depicted in receiver circuit 900 in FIG. 9 eliminates 1/f noise and the requirement for DC offset cancellation circuitry, while simultaneously rejecting narrowband interferers. Conceptually, the first self-mixer, MIX1 940, yields the signal power and the IF bandpass filter only passes the changes in signal power. The second self-mixer, MIX2 960, and the integrator within the digital processor (DIGIPRO) 1600 therefore yields the energy of the change in signal power, which is intrinsically low for carrier-based narrowband signals and high for UWB pulsed signals. The double-square method also enhances signal-to-noise ratio by performing an effective fourth-order nonlinear operation.

Figure 14:
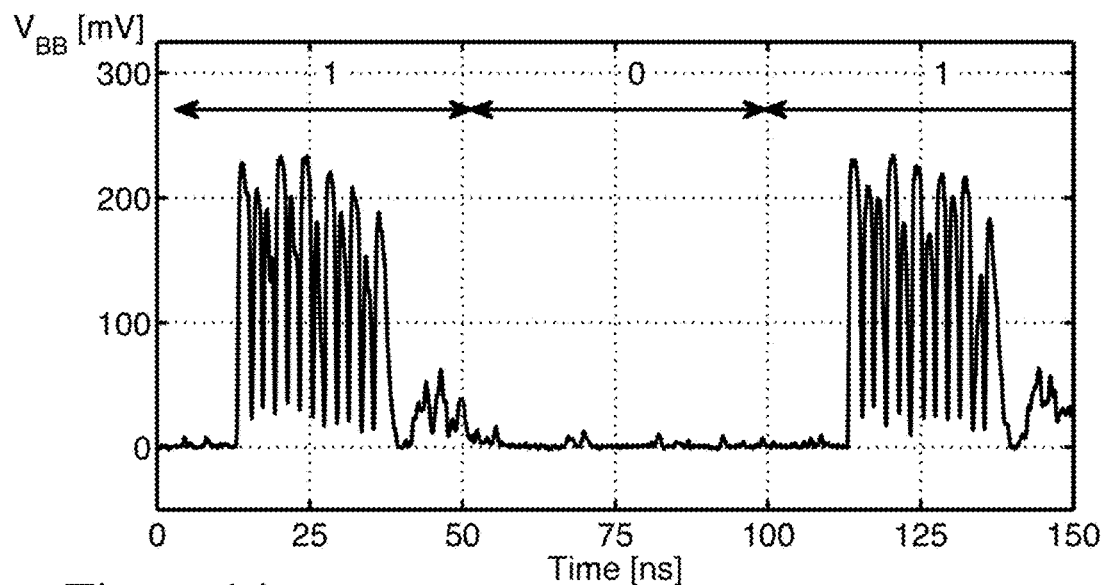
FIG. 14 depicts a receiver baseband output signal for a 6-pulse bundle per bit implementation of a UWB protocol and UWB receiver/transceiver according to an embodiment of the invention.

The baseband output after MIX2 (at node 1320) for a 6-pulse RF input signal as processed by a submicron CMOS prototype implementation of receiver 900 is shown in FIG. 14. The rising and falling flank of each Gaussian filtered pulse is represented by a peak in $V_{BB}$. An integration of the baseband voltage over the symbol period yields the energy in the pulse and is used in the demodulation of the symbol.

E. Transmitter—Receiver Synchronization and Clocking

As discussed supra the receiver (Rx) and transmitter (Tx) of a UWB communications link are not synchronized to each other through distributed timing information unlike within some other wireless protocols. Accordingly, a requirement of each circuit is efficient synching between Tx and Rx in order to maintain the extremely aggressive duty cycling of the wireless impulse radios according to embodiments of the invention, thereby maintaining the energy efficiency inherent to impulse radio communications. Accordingly, the inventors have established a low latency transmitter/receiver synchronization method/algorithm using dedicated synchronization hardware, including a dual clock timer system for ultra-low sleep mode power consumption. This allows for efficient synching between Tx and Rx in order to maintain the extremely aggressive duty cycling of the radio, thus maintaining the energy efficiency inherent to impulse radio communications.

A multiphase clock baseband transceiver was designed in order to reduce clock frequency (e.g., 20 MHz instead of 200 MHz) and enhance power efficiency. Further, a parallelized ADC/integrator structure, DIGIPRO 1600 in FIG. 9, was employed in order to allow for faster synchronization and enhanced interference detection. This structure allows for full signal observability during the receive timeframe. This structure also allows for dynamically changing modulation schemes (e.g. OOK, PPM) to improve robustness of communications based on the channel or regulatory environment.

E1. Low Power Clock Generator

Referring to FIG. 1500A there is depicted a first clock generator (CLKGEN1) 1500 which may be adopted within an embodiment of the invention presented within this specification and as such CLKGEN1 1500 provides the 20 MHz signal to the transmitter 300 as well to the DIGIPRO 1600 within receiver 900 in FIG. 9. The low-power clock generator, CLKGEN1 1500, comprises an inverter INV1 1520 which acts as a low frequency oscillator, i.e. 32 kHz, together with crystal XTAL 1510, resistor R1 and capacitors C1 and C2. The sinusoidal oscillator signal is amplified to a square wave clock by inverter INV2 1525 and used as the reference in a Phased Lock Loop (PLL) 1590. PLL 1590 consists of a Voltage Controlled Oscillator (VCO) 1550 whose output is divided in frequency by a Divider 1580 and compared to the reference by a Phase Detector 1530. Depending on whether the divided clock has lower or higher frequency than the reference, pulses on either DOWN or UP are generated. A Charge Pump 1540 together with resistor R2 and capacitors C3 and C4 filter the UP and DOWN signals into a control signal for the VCO. When locked, the loop generates an output clock buffered by inverter INV3 1560 that is an integer multiple of the reference clock.

As noted supra the efficient implementation of the clock generation and synchronization in an UWB transceiver is crucial for low power operation. With pulse durations on the order of nanoseconds, a conventional and straightforward synthesized digital approach would require a base clock of several hundreds of MHz or more, with high associated dynamic power consumption. Generating the base clock directly with a crystal clock generator would lead to a relatively high power consumption. Because crystal oscillator power scales directly with frequency, operating a crystal oscillator at much lower frequency (e.g. 32 kHz) and multiplying the frequency with a Phased Locked Loop (PLL) significantly reduces the power consumption. This strategy is exploited by the inventors for low power clock generation in the UWB transceiver. The base clock for the digital logic is set to the symbol frequency, e.g. 20 MHz, which is the rate that symbols are processed by the digital baseband hardware and is generated by a clock generator such as CLKGEN1 1500 in FIG. 15 which exploits lower power low frequency oscillator XTAL 1510. Then as depicted in respect of transmitter 300 in FIG. 3 the 20 MHz clock is coupled to a delay locked loop (DLL) 330 that derives multiple phases from this clock at nanosecond range intervals, which are used as a timing basis to generate the symbol pulses in conjunction with Multiplexer 320, DCO 340 and Pulser 350. The pulse generator control signals are generated by a multiplexer, which selects the control bits from a memory, Pulse Pattern 310, on the edges of the DLL multiphase clock.

The PLL 1590 has a startup time in the millisecond range, which is effectively limited by the number of crystal oscillator cycles required to stabilize the loop. At data rates higher than 50 kbps the PLL 1590 and DLL 330 remain ON between frames and have been optimized for low power consumption. At data rates of 50 kbps or lower, both the PLL 1590 and DLL 330 can be power cycled in between frames such that the only power consumption during sleep mode is from the crystal oscillator.

E2. Synchronization

It would be evident that synchronization of the receiver clock is required as the transmission methodology of the UWB links has no clock data transmitted. Accordingly, as depicted in respect of FIG. 16 a synchronization block 1630 is employed in conjunction with DIGIPRO 1600 of the receiver 900 depicted in FIG. 9. As depicted in FIG. 16A the DIGIPRO 1600 comprises a pair of double-edge-triggered integrator and Analog-to-Digital Converter (ADC) blocks. Each of the first and second integrators 1610A and 1610B integrates over half the symbol period and its output is digitized with one of the first and second ADCs 1620A and 1620B. These, for example, may be a 3-bit flash ADC. The two integrator-ADC blocks are offset by a quarter symbol period, so that a total of four overlapping integration windows are available during each symbol. This being evident in FIG. 16B.

Synchronization during the synchronization frame block is achieved by determining the integration window with maximum energy such that clock synchronization of the receiver can thus in principle be achieved with one synchronization symbol. Additional synchronization symbols are needed in practice to account for the variable gain loop that tracks changes in the channel of the wireless link. PPM demodulation is achieved by observing the integration window with maximum energy for each symbol, and OOK modulation is achieved by observing the energy in a fixed integration window.

F. Transceiver Configuration

F1. System Energy Efficiency

Figure 17:
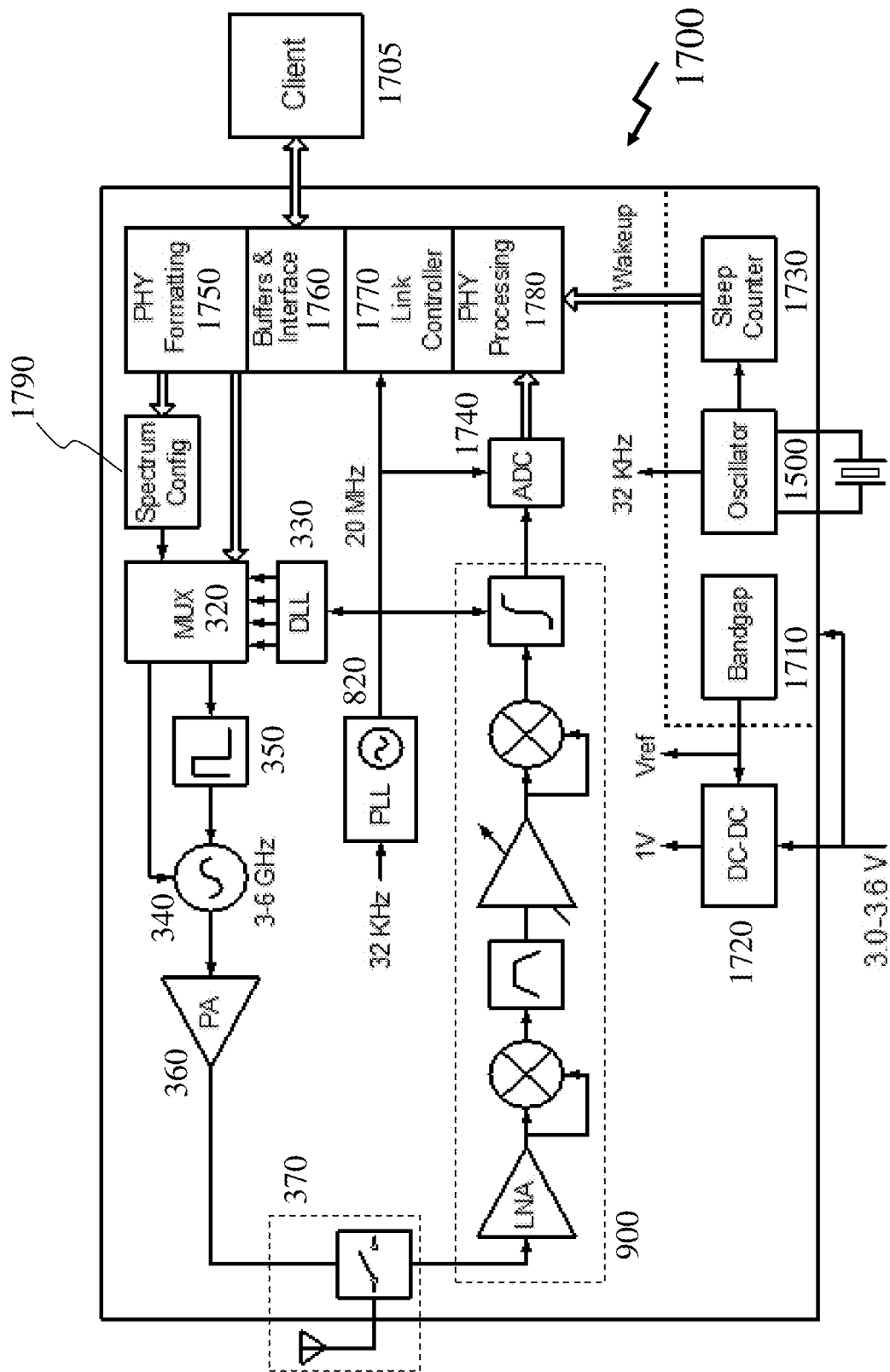
FIG. 17 depicts a circuit schematic for a UWB transceiver according to an embodiment of the invention.

The inventors established design parameters of millisecond range start-up time from sleep mode and microsecond range start-up time from idle mode by establishing a custom integrated DC/DC converter and duty cycled transceiver circuitry that enables fast circuit start-up/shut-down for optimal power consumption under low (1 kbps) and moderate data rates (10 Mbps). In order to sustain good energy efficiency, the elements of the total UWB transceiver 1700 in FIG. 17 according to an embodiment of the invention have been co-designed for low static sleep current and fast startup/sleep times.

A battery (3.0 V≤$V_{BATT}$≤3.6 V) powers a low-frequency crystal oscillator 1500, sleep counter 1730 and bandgap reference 1710, all of which are typically always operational although the bandgap reference 1710 could be duty cycled within other embodiments of the invention without altering the scope of the claimed invention). Their power consumption limits the minimum power consumption of the system to sub-microwatt level. An integrated buck DC-DC converter 1720 is powered by the battery when the system is not in sleep mode, and this provides the supply voltage to the rest of the system with high conversion efficiency. The startup time of the DC-DC converter 1720 is on the order of several symbol periods in order to minimize wasted energy. Between sleep periods, the PLL 820 is active to provide the base clock for the system. The receiver 900 and DLL 330 have dedicated power down controls and are only activated during frame transmission/reception. Since the transmitter is inherently power cycled due to its all-digital architecture, a separate control is not required. The power consumption of the digital synthesized blocks is low due to the low base clock (e.g. 20 MHz).

In principle, a power-cycled transceiver achieves linear scaling of power consumption with data rate, thus achieving constant energy efficiency. With a fixed frame size, multiple data rates are obtained by adjusting the length of the sleep period, with the maximum attainable data rate determined by the symbol rate in the frame itself. In order to preserve energy efficiency, the power consumption during sleep must be lower than the average power consumption. For high data rates, powering down the PLL is not required as its consumption does not significantly degrade the overall efficiency. For low data rates, the whole system except the bandgap reference, crystal oscillator, and sleep counter is shutdown during sleep mode. In this case, the millisecond range startup time of the PLL is insignificant compared to the sleep period, and overall efficiency is also not significantly degraded.

As depicted the UWB transceiver 1700 also comprises a receive/transmit switch 370, spectrum configuration 1790 (equivalent to Pulse Pattern 310 in transmitter 300 in FIG. 3), PHY Processing circuit 1780, Link Controller 1770, Buffer and Interface circuit 1760, and PHY Formatting circuit 1750. The UWB transceiver 1700 communicates via Link Controller 1770 to the Client 1705. As such, Link Controller 1770 may communicate using a wired protocol to Client 1705, for example.

F2. Exemplary Communication Flows

The inventors have established, in order to ensure low power consumption of the transceivers, transmitters, and receivers according to embodiments of the invention, process flows with respect to for detecting when a transmitter has data to be sent and potential polling scheme in a wireless sensor network. It is important to note that the hardware proposed in this description of an embodiment of the invention has enough configurability to explore all of the options presented, as well as others not explicitly defined. It is also important to note that numerical values presented are meant to illustrate the schemes proposed more tangibly, but are in no means meant to be limitative with respect to the breadth of the invention, and are established based upon initial prototypes fabricated using a submicron CMOS foundry line.

The assumptions—analysis basis are as follows:
Symbol duration—25 ns;
System clock is 20 MHz;
Symbol repetition rate is 50 ns;
On-chip buffer of 1000 bits is available (not implemented in prototype transceiver circuit and could be other dimensions, including for example 1024 bits to provide 128 bytes storage);
Separate Tx and Rx buffers; and
Low frequency sleep clock is 32 kHz.
Power consumption in the different modes is:
Receiver fully on=12 mA;
Idle Mode (DC-DC converter and frequency synthesizer are on)=10 µA;
Sleep Mode (only 32 kHz oscillator is on)=1 µA; and
Transmitter Energy=0.5 nJ/symbol.

The data flows presented and discussed below provide additional room for bits associated with multi-user environments and robust communications such as an addressing scheme for multi-user environments and a cyclic redundancy check (CRC) code for error checking. Within sections F4.1 to F4.4 exemplary schemes for data rates of 10 Mbps, 1 Mbps, 100 kbps and 10 kbps are presented. These data rates are for raw data, and do not include any effects of coding such as forward error correction, data encryption, and coding to ensure long runs of "0" (or "1"s in some instances) do not occur and can also be used to increase the range of communications.

Section F.3 below presents a scheme for detecting when a transmitter has data to be sent, as this is the first step in any communications link. This scheme is based on the receiver polling the channel for a transmitted signal, and is targeted towards systems where data are sparsely sent, e.g. once every 5 to 10 minutes or longer. For more frequent data transfers, a scheme exploiting beacons may be more appropriate with these beacons sent at recurring intervals whether there is data to be sent or not. This keeps the transceivers synchronized, but would add overhead for networks with infrequent data transmissions.

It is important to note that whilst hardware-based detection schemes such as those presented can be included in the transceiver, that users will also be able to turn them off and use their own schemes under software and/or firmware control. For example, in some applications a user may want to have a receiver on 100% of the time to ensure that no packets are missed and is more appropriate to applications where there are no power restrictions on a particular node, e.g. the UWB transceiver is connected to the USB port of a laptop for example. In sensor network applications, the user should also have the option to use a different polling/detection scheme than the one implemented by the transceiver manufacturer.

F3. Polling/Packet Detect Scheme

Figure 18:
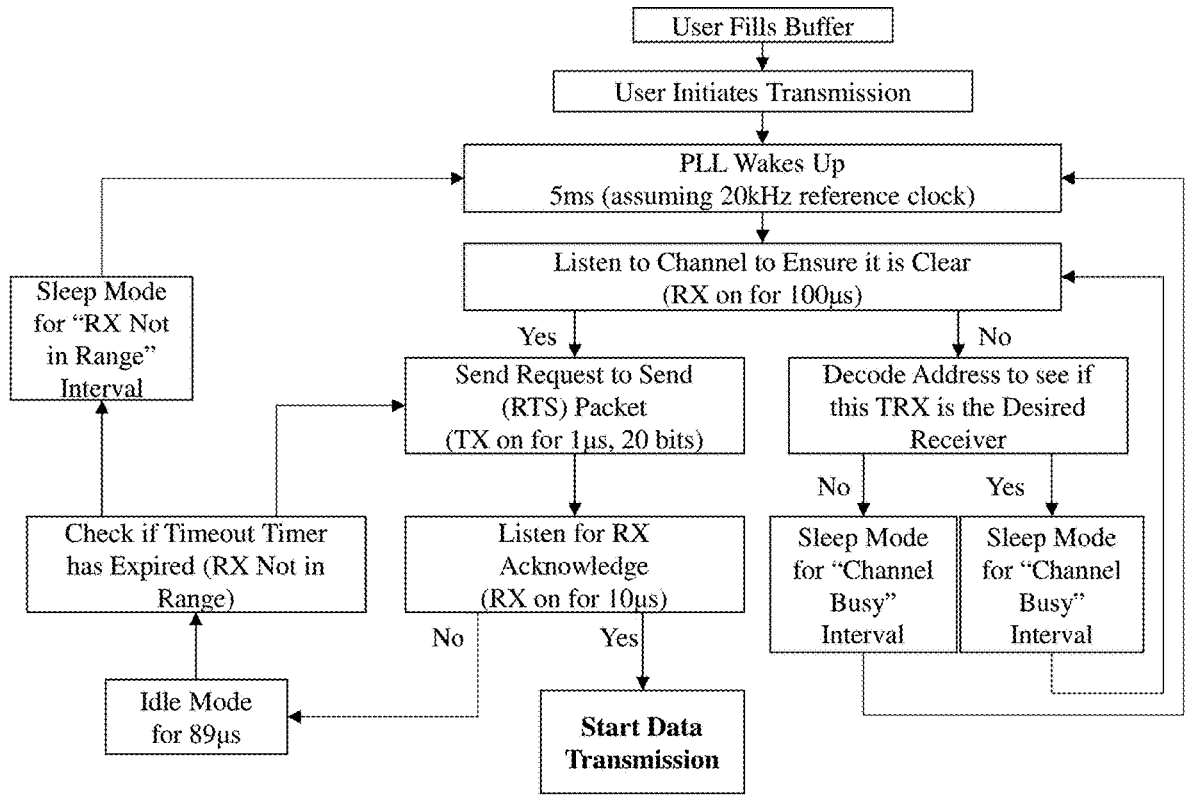
FIGS. 18 and 19 depict transmitter and receiver flow diagrams for a polling scheme within a UWB wireless sensor network according to an embodiment of the invention.
Figure 19:
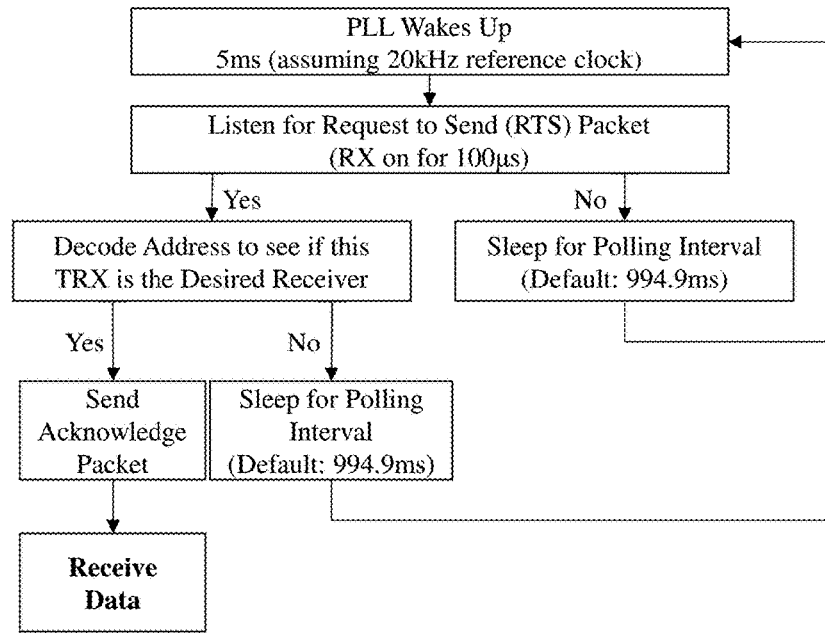

Transmitter and receiver flow diagrams for a potential polling scheme in a wireless sensor network are presented in FIGS. 18 and 19 respectively. The core of the scheme may be summarized as follows:

the receiver within each node wakes up for 100 µs every second to see if another node wants to send data, where if it detects a Request to Send (RTS) packet from a transmitter, it sends an acknowledge (ACK) packet and data transfer begins; and when a node does have data to send, it transmits an RTS packet, and to ensure the packet is sent within the 100 µs window in which the receiver is listening, it must keep repeating this packet. After each repetition its receiver turns on to listen for an ACK packet to see if data can be transferred. The RST packet is 1 µs long, forcing a Tx/Rx window overlap over the RST packet repetitions, and mitigating any impact from static timing offset between the Tx and Rx.

For the schemes presented below in respect of Sections F4.1 to F4.4 the current consumption associated with the receiver is fixed at 2.24 µA based upon prototype submicron CMOS implementations of the transceiver by the inventors. The transmitter current consumption depends on how frequently a sensor node needs to send new data such that, for example, if it needs to send data every 10 seconds, the worst-case current consumption is 130 µA but if it needs to send data every 5 minutes, the worst-case current consumption is 4.35 µA, wherein these figures are again derived from prototype submicron CMOS implementations of the transceiver by the inventors. Worst-case in these instances means the transmitter starts sending its RTS packet right after the 100 µs listening window of the intended receiver ends, so it must send an RTS packet for a full second. It would be evident from the current consumption numbers presented above as to why the transceiver implemented by the inventors was intended for applications where data is not sent very frequently.

F4. Data Communications Protocols for Various Bit Rates

F4.1 10 Mbps Communications

The communications scheme, timing, and current consumption for the transmitter and receiver are shown in FIGS. 20A and 20B wherein the approach is similar to the 1 Mbps case presented below in Section F4.2 where the data rate is increased by sending more pulses with less power to meet the emission mask regardless of the increased number of pulses per second. There are two ways to do this A) Keep sending 6 pulses/symbol as per Section F4.2 but reduce the power of each pulse by 10×; and B) Reduce the number of pulses to be sent. For instance, can send 3 pulses at frequencies $f_1$, $f_2$, $f_3$ having a 5× less power during one symbol, and send 3 pulses at frequencies of $f_4$, $f_5$, $f_6$ with a 5× less power during the next symbol. It would be evident that other combinations are possible as well.

As data rate has increased by 10× from the 1 Mbps scenario in F4.2 the achievable communications distance will be reduced. The average current consumption for the transceiver is:

Transmitter 500 µA
Receiver 6.02 mA.

F4.2 1 Mbps Communications

The communications scheme, timing, and current consumption for the transmitter and receiver are shown in FIGS. 21A and 21B respectively below. These assume a packet detection scheme such as the one described above has already taken place. At this data rate the receiver will jump between active and idle modes. The idle mode also needs to be at regular intervals to avoid exceeding the transmission limits imposed by the regulatory mask, e.g. FCC, which are measured over a 1 ms interval. The average current consumption for the transceiver is:

Transmitter 509 µA
Receiver 623 µA.

F4.3 100 kbps Communications

For communications at 100 kbps, there are two main options:

Option 1: Send the data in a burst and then sleep for the rest of the cycle as depicted in FIGS. 22A and 22B which is the lowest power method and provides the same transmission distance as for a 1 Mbps data rate; and Option 2: Reduce the data payload to 100 bits, and repeat this every millisecond as depicted in FIGS. 22C and 22D. This will allow more power per symbol so communications distance can be increased, but it will also increase the power consumption as compared to the other mode above.

The average current consumption for each option is:

| Option 1: | Transmitter | 51.9 µA | Receiver | 63.2 µA |
| Option 2: | Transmitter | 59.9 µA | Receiver | 83.1 µA |

Note that the pulses in Option 2 can have 10× as much power as in option 1, and therefore the communication distance can be increased. This would also increase the transmitter power.

F4.4 10 kbps Communications

For communications at 10 kbps, there are two main options:

Option 1: Send the data in a burst and then sleep for the rest of the cycle as depicted in FIGS. 23A and 23B which is the lowest power method and provides the same transmission distance as for a 1 Mbps data rate; and Option 2: Reduce the data payload to 10 bits, and repeat this every millisecond as depicted in FIGS. 23C and 23D. This will allow more power per symbol so communications distance can be increased, but it will also increase the power consumption as compared to the other mode above.

The average current consumption for each option is:

| Option 1: | Transmitter | 6.13 µA | Receiver | 7.26 µA |
| Option 2: | Transmitter | 15.0 µA | Receiver | 28.0 µA |

Note that the pulses in Option 2 can have 100× as much power as in option 1, and therefore the communication distance can be increased. This would also increase the transmitter power.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for wireless communication comprising:
an ultra-wideband (UWB) receiver for receiving data; wherein
the UWB receiver comprises:
an intermedia frequency (IF) receiver stage comprising at least two stages of down-conversion; and
at least one of a high pass and a band-pass filter disposed between each pair of stages of the at least two stages of down-conversion, and
the first stage of each pair of stages of the at least two stages of down-conversion is a squaring stage that translates that an input RF signal spectrum at its input to an output RF signal spectrum that extends down to DC.

2. The system according to claim 1, wherein
the UWB receiver further comprises:
a synchronization circuit comprising a pair of parallel analog-to-digital converter/integrator structures; and
the synchronization circuit achieves at least one of faster synchronization and enhanced interference detection.

3. The system according to claim 1, wherein
the UWB receiver supports on-off keying encoding and pulse-position modulation encoding of data.

4. A method relating to wireless communication of data comprising:
an ultra-wideband (UWB) receiver for receiving the data; wherein
the UWB receiver comprises:
an intermedia frequency (IF) receiver stage comprising at least two stages of down-conversion; and
at least one of a high pass and a band-pass filter disposed between each pair of stages of the at least two stages of down-conversion, and
the first stage of each pair of stages of the at least two stages of down-conversion is a squaring stage that translates that an input RF signal spectrum at its input to an output RF signal spectrum that extends down to DC.

5. The method according to claim 4, wherein
the UWB receiver further comprises:
a synchronization circuit comprising a pair of parallel analog-to-digital converter/integrator structures; and
the synchronization circuit achieves at least one of faster synchronization and enhanced interference detection.

6. The method according to claim 4, wherein
the UWB receiver supports on-off keying encoding and pulse-position modulation encoding of data.

7. A system for wireless communication comprising:
an ultra-wideband (UWB) receiver for receiving data; wherein
the UWB receiver comprises:
a first portion for processing the received ultra-wideband wireless signals to generate converted received signals; and
a second portion for processing the converted received signals to a plurality of digital signals;
the second portion of the UWB receiver comprises a clock generator for generating a plurality of clock signals and a decision circuit generating the plurality of digital signals in dependence upon the converted received signals and the plurality of clock signals; and
the plurality of clock signals are at a frequency determined in dependence upon a symbol rate for bits of data encoded within the ultra-wideband received wireless signals.

8. A method relating to wireless communication of data comprising:
an ultra-wideband (UWB) receiver for receiving the data; wherein
the UWB receiver comprises:
a first portion for processing the received ultra-wideband wireless signals to generate converted received signals; and
a second portion for processing the converted received signals to a plurality of digital signals;
the second portion of the UWB receiver comprises a clock generator for generating a plurality of clock signals and a decision circuit generating the plurality of digital signals in dependence upon the converted received signals and the plurality of clock signals;
the plurality of clock signals are at a frequency determined in dependence upon a symbol rate for bits of data encoded within the ultra-wideband received wireless signals.

* * * * *